(12) United States Patent
Anderson

(10) Patent No.: US 8,045,654 B1
(45) Date of Patent: Oct. 25, 2011

(54) MATCHED DETECTOR/CHANNELIZER WITH ADAPTIVE THRESHOLD

(75) Inventor: Robert Anderson, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 300 days.

(21) Appl. No.: 12/239,426

(22) Filed: Sep. 26, 2008

Related U.S. Application Data

(62) Division of application No. 10/636,322, filed on Aug. 6, 2003, now Pat. No. 7,430,254.

(51) Int. Cl.
*H03D 1/00* (2006.01)
*H04L 27/06* (2006.01)

(52) U.S. Cl. ........ 375/342; 375/260; 375/316; 375/343; 375/350; 370/210; 370/307

(58) Field of Classification Search .............. 375/342, 375/343, 350, 260, 312, 307, 210
See application file for complete search history.

(56) References Cited

U.S. PATENT DOCUMENTS

| | | | |
|---|---|---|---|
| 4,237,551 A | 12/1980 | Narasimha | |
| 5,068,813 A | 11/1991 | Thoen | |
| 5,612,700 A | 3/1997 | Tucker | |
| 5,710,763 A | 1/1998 | Harrison | |
| 5,787,201 A | 7/1998 | Nelson et al. | |
| 5,953,365 A | 9/1999 | Badke | |
| 6,005,885 A * | 12/1999 | Warren et al. | 375/152 |
| 6,014,366 A | 1/2000 | Ichiyoshi | |
| 6,229,998 B1 | 5/2001 | Hamdy et al. | |
| 6,263,195 B1 | 7/2001 | Niu et al. | |
| 6,297,764 B1 | 10/2001 | Wormington et al. | |
| 6,366,880 B1 | 4/2002 | Ashley | |
| 6,731,690 B2 * | 5/2004 | Harrison | 375/260 |
| 6,985,102 B1 | 1/2006 | Horn et al. | |

OTHER PUBLICATIONS

Alhava, Juuso and Renfors, Markku. Adaptive Sine-Modulated/Cosine-Modulated Filter Bank Equalizer for Transmultiplexers. European Conference on Circuit Theory and Design. pp. III-337-III-340. Aug. 28-31, 2001.

Viholainen et al. Implementation of Parallel Cosine and Sine Modulated Filter Banks for Equalized Transmultiplexer Systems. Telecommunications Laboratory. Tampere University of Technology. pp. 3625-3628. 2001.

* cited by examiner

*Primary Examiner* — Ted Wang
(74) *Attorney, Agent, or Firm* — McDermott Will & Emery LLP

(57) ABSTRACT

A method of detecting a signal in an input channel of a receiver includes applying each of a plurality of pre-detection bandwidths to an input signal. The method can include deriving, in a cascaded fashion, a plurality of pre-detection bandwidths for the input channel, and determining a temporal and spectral extent of pulsed energy in each of the plurality of pre-detection bandwidths. The derivation of the pre-detection bandwidths for the input channel can be performed by dividing the input channel into a sequence of smaller bandwidth sub-channels, so that the number of sub-channels is determined by how much bandwidth and pulse width range is able to be covered by a single detector.

12 Claims, 17 Drawing Sheets

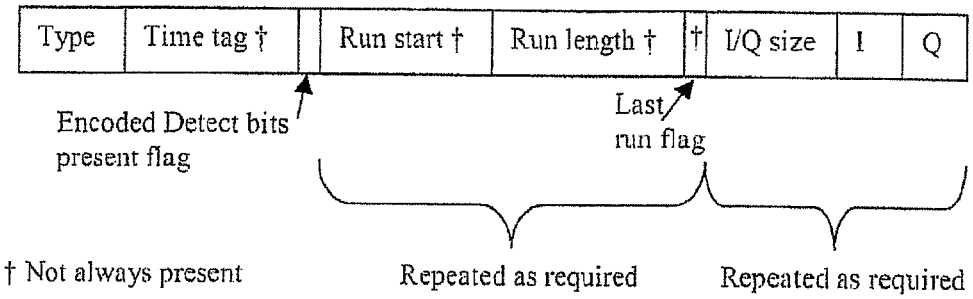

FIG. 14

Type 0: Time Short With Detect Flags
| 0 | 0 | 0 | Time short | Run length | Run start | L | Sample size | I | Q |

←Repeat as required→   ←Repeat as required→

Type 1: Time Long With Detect Flags
| 0 | 0 | 1 | Time long | Run length | Run start | L | Sample size | I | Q |

←Repeat as required→   ←Repeat as required→

Type 2: No Time With Detect Flags
| 0 | 1 | 0 | Run length | Run start | L | Sample size | I | Q |

←Repeat as required→   ←Repeat as required→

Type 3: Time Short With No Detect Flags
| 0 | 1 | 1 | Time short | Sample size | I | Q |

←Repeat as required→

Type 4: Time Long With No Detect Flags
| 1 | 0 | 0 | Time long | Sample size | I | Q |

←Repeat as required→

Type 5: No Time With No Detect Flags
| 1 | 0 | 1 | Sample size | I | Q |

←Repeat as required→

Type 6: Background Noise Estimates (BNE)
| 1 | 1 | 0 | 000...00 | BNE 00 | BNE 01 | ... | BNE 80 |

Type 7: Fill bits
| 1 | 1 | 1 | Fill bits – all 1's |

FIG. 15

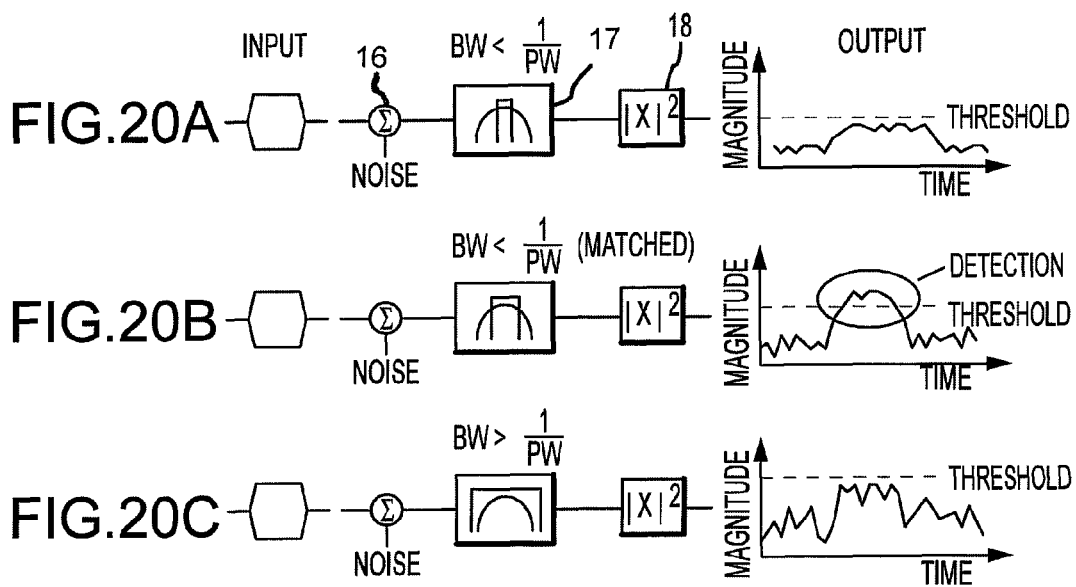
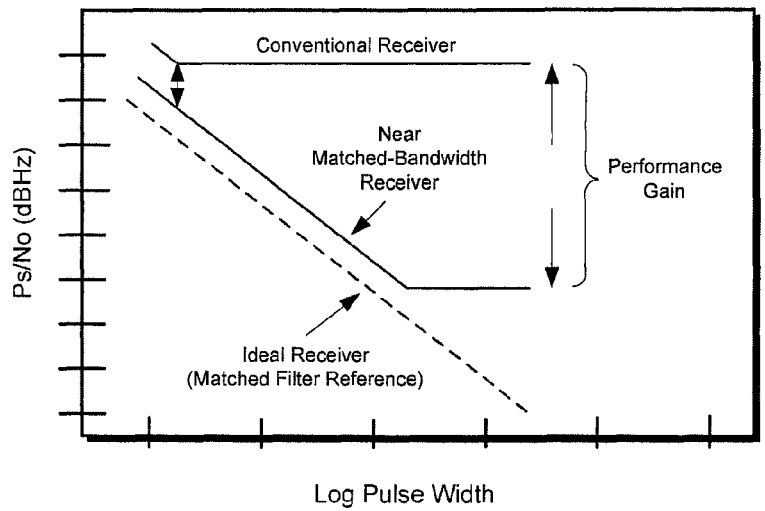
FIG. 21

MATCHED DETECTOR/CHANNELIZER WITH ADAPTIVE THRESHOLD

CROSS REFERENCE TO RELATED APPLICATIONS

This application is a divisional of and claims priority from U.S. Utility patent application Ser. No. 10/636,322, filed Aug. 6, 2003, and issued as U.S. Pat. No. 7,430,254, entitled "MATCHED DETECTOR/CHANNELIZER WITH ADAPTIVE THRESHOLD", the entirety of which is hereby incorporated by reference herein.

FIELD OF THE INVENTION

The present invention relates generally to improved methods and systems for bandwidth detection of a large variety of signal types over a wide range of frequencies and pulse widths, and more particularly, to methods and systems allowing for improved sensitivity, lower threshold of detection, multilevel detection, and obtaining different compression versions of data streams.

BACKGROUND OF THE INVENTION

Conventional pulsed energy detectors are typically of two types: matched filter or crystal video. A matched filter makes use of detailed a priori knowledge of the pulse being detected. Pulse shape, frequency, and sometimes phase are used to construct the detector. Matched filter detectors offer optimal sensitivity, but do not function well for frequencies or pulse widths other than the original design point.

Crystal video receivers offer performance over a range of frequencies; however, the video filter is targeted at a particular pulse width. The sensitivity is not as good as a matched filter receiver and degrades as a function of the radio frequency (RF) bandwidth/Video bandwidth ratio.

Important criteria for pulsed energy receivers are sensitivity, instantaneous bandwidth (IBW), and false alarm rate (FAR). Sensitivity specifies the relationship between pulse power, probability of detection (PD) and noise density ($N_0$) for a given type of pulse. Often sensitivity is specified for a pulse power to input noise power ratio, which is called the signal to noise ratio (SNR).

Pulses may be classified as modulated or unmodulated. Pulses may be modulated for pulse compression or reduced detectability. Unmodulated pulses are essentially time-gated sections of a continuous wave (CW) signal.

Radar (radio detection and ranging) and sonar (sound navigation ranging) are examples of systems which must detect pulsed energy in the presence of background noise. Radar terminology is used here, although the principals and techniques apply to a wide variety of applications.

Pulse compression allows a radar to use a long pulse to achieve large radiated energy per pulse, while obtaining a range resolution of a short pulse of wide bandwidth. A radar system achieves this condition by modulating the long pulse of width T to achieve a bandwidth B>>1/T. The received signal is passed through a matched filter to produce a compressed pulse of width 1/B. The pulse compression ratio is equal to BT. Frequency and phase modulations are typically used for pulse compression.

Spread spectrum techniques may be used to reduce detectability of radar pulses by unintended parties. A conventional spread-spectrum system may employ a modulation technique in which a narrow-band signal (a long pulse) is spread over a broad frequency range using a spreading function. Such a signal may contain a significant amount of total energy while maintaining a small energy at any given frequency, even below the level of background noise. The signal thus blends into the noise. Since the energy contained in the signal is very low at any given frequency, the signal is difficult to detect. Spread spectrum detectors must, therefore, utilize techniques for improving pulse detection sensitivity in a noisy environment.

In a direct-sequence type spread spectrum system having a signature sequence, the bandwidth of the spread-spectrum signal is usually much larger than that of the pulse envelope. A typical receiver used with binary direct-sequence spread-spectrum modulation and having an additive white Gaussian noise channel (thermal noise only) is a correlation receiver. In such a receiver, a received signal is multiplied in a frequency conversion process and the product is integrated over an interval that approximates the pulse duration.

A conventional receiver may include a receive antenna, an RF preamplifier, mixers that operate using a local oscillator (LO), an intermediate frequency (IF) low pass filter, an analog-to-digital (A/D) converter having a high sampling rate, a memory for storing data having a predetermined resolution, processors for modifying the data, such as by using a Fast Fourier Transform (FFT), and digital signal processors (DSPs) for additional processing, such as filtering or additional FFTs. To maximize the bandwidth most efficiently, the sampling is usually done in quadrature to create I and Q channels, as is known.

A "channel" may include a discrete channel, a continuous channel defined on discrete time instants, or a waveform channel defined on a continuum of time points.

A "noisy channel" is one for which the channel's output symbol is not completely determined by the channel's input symbol; only some probability distribution on the set of output symbols is determined by the input symbol. If the probability is independent of previous inputs or outputs from the channel, the channel is called "memoryless." Information can be sent reliably through a discrete noisy channel by use of elaborate crosschecking techniques known as error control codes. A noisy channel may also have constraints that can identify codes to be treated separately from the error control codes.

A channel's capacity is generally known to be the maximum rate at which information can be transmitted through the channel. At any rate below channel capacity, an error control code can be designed to balance an amount of error control and a throughput for a channel. Well-known error control codes may control and/or operate with various other parameters. A selection of coding for a channel may also relate to whether information is fixed-length, variable length, infinite length, etc.

Compression is a technique which allows a larger volume of information to be passed through a channel of fixed capacity. Compression methods are classified as lossless or lossy. Lossless compression allows exact recovery of the original data. Lossy compression discards unimportant features of the original data, allowing greater compression ratios than lossless techniques.

A variable-bandwidth frequency division multiplex communication system is known, where a sampling frequency is a multiple of the channel frequency interval A f. However, such a system results in aliasing and other frequency-based sampling problems concerning transmultiplexers, so that channel bandwidth is less than channel spacing.

The trend in modern radar systems is toward a use of complex signals with agility over several parameters. This requires implementation of good detection sensitivity and wide bandwidths to meet increasing performance demands. Existing digital systems have either poor sensitivity or limited bandwidth, and little or no compression capability. What is needed is the development of wideband digital receivers with low power consumption and improved sensitivity, and improved compression capabilities.

SUMMARY OF THE INVENTION

It is an object of the present invention to enable wideband digital receivers to have low power consumption and improved detection sensitivity.

It is another object of the present invention to improve detection sensitivity to enable detection of more signals.

It is a further object of the present invention to obtain a wide instantaneous bandwidth.

It is yet another object of the present invention to achieve full performance in a wideband digital receiver over a wide range of pulse widths.

It is a still further object of the present invention to provide in a low power wideband digital receiver a compressed output that contains only desired signal data, thereby reducing onboard storage and transmission requirements.

It is also an object of the present invention to improve in a wideband digital receiver a data compression ratio, detection sensitivity, and instantaneous bandwidth coverage while reducing power, size, and mass.

In order to meet these and other objectives, the present inventor has recognized a need for providing a near-matched bandwidth detection, capable of detecting a wide variety of signal types and pulse widths with high sensitivity. The detected signals may include non-modulated, simple modulated, linear frequency modulated (FM), binary phase shift keying (BPSK) signals and others, alone or in combinations of signal types. Matching bandwidths to signals advantageously allows for, inter alia, improved sensitivity, lower threshold of detection, higher data rates, and increased system efficiency.

The present inventor has also recognized the benefit of providing fine channelization by detecting and determining the temporal and spectral extent of signals of potential interest within particular frequency band(s). Estimates of the spectral and temporal extent of detected signals are used to minimize the amount of data that must be stored or transmitted to another part of the system. The estimates may be used, for example, to match a sub-channel bandwidth to the temporal and spectral extent of signals of potential interest within particular frequency band(s).

According to one aspect of the present invention, a method is provided for detecting a signal in an input channel of a receiver. The method involves deriving a plurality of pre-detection bandwidths for the input channel, and determining a temporal and spectral extent of pulsed energy in each of the plurality of pre-detection bandwidths. For example, time and frequency ranges may be determined for multiple bandwidths. In this regard, the step of deriving may include dividing the input channel into a sequence of successively smaller bandwidth sub-channels.

An associated receiver for detecting pulse energy present in an input channel includes means for deriving a plurality of pre-detection bandwidths for the input channel, and means for determining a temporal and spectral extent of pulse energy in each of the plurality of pre-detection bandwidths. The receiver preferably includes first structure for applying each of a plurality of pre-detection bandwidths to an input signal, and second structure for determining a temporal and spectral extent of pulsed energy in each of the plurality of pre-detection bandwidths. The first structure may include a sub-channelizer operative to divide the input channel into a sequence of successively smaller bandwidth sub-channels. The second structure may include a detector operative to obtain data from one of the sub-channels and produce detected samples.

The receiver may also include a filter operative to integrate a fixed number of the detected samples. The filter may, for example, be a video filter. A comparator can then compare an output of the filter against a threshold to determine the presence of pulse energy. The receiver may also include a noise estimator operative to form a value of the threshold based on an estimate of a noise density of at least part of the input channel.

According to another aspect of the present invention, a method of detecting a signal in an input channel of a receiver involves applying each of a plurality of pre-detection bandwidths to the same input signal. Specifically, the method involves determining the temporal and spectral extent of signals of potential interest within particular frequency bands of the data channel, determining whether the temporal and spectral extent of signals meet predetermined criteria, and outputting only sections of the particular frequency bands' spectra occupied by those signals meeting the predetermined criteria. This allows for improved sensitivity for detecting pulsed energy in a data channel in the presence of noise. The step of outputting may involve generating at least one packet where information in the packet specifies a time and frequency region where energy was detected. The outputting step may further involve compressing a packet relative to the data rate of a data channel, by selecting data in a time and frequency region around detected pulses. In this manner, the output can be substantially compressed while retaining, to a great degree, the information present in the input channel signal.

According to a further aspect of the present invention, a system for detection of at least one type of signal includes a sensor operative to collect and output signals, an analog-to-digital (A/D) converter operative to convert signals obtained from the sensor and output digital information, a channelizer operative to obtain the digital information and channelize the digital information, by frequency, into at least one channel of information, and a processor operative to derive a plurality of pre-detection bandwidths for the channelizer and operative to determine a temporal and spectral extent of pulse energy in each of the plurality of pre-detection bandwidths. The channelizer preferably channelizes the digital information based on the temporal and spectral extent of pulse energy in each of the plurality of pre-detection bandwidths.

As a result of implementing various aspects of the present invention, spectral and temporal areas of interest within an input are identified based on channelization. By deriving a number of sub-channels, for example, based on detection parameters, an improved sensitivity and accuracy is obtained. Identification of temporal and spectral areas of interest within an input may be based on threshold analysis. For example, in a fixed mode, stored parameters such as leading edge, trailing edge, etc. may be stored in a memory such as a register. In an automatic mode, for example, a background noise estimator may be used. In addition, spectral and temporal areas of interest may be identified based on a process of cascaded filtering and tie-together, which provides an adaptive design for achieving high performance levels. Further, areas of interest may be selected by identification and padding of data in packet form. Also, areas of interest may be selected and/or output by a reconstruction that is simple and meets advanced frequency selectivity requirements because sub-channels, for example, may contain the entire input spectrum, alias free, or may use selected middle 'sweet spots' from each sub-channel.

Radar (radio detection and ranging) and sonar (sound navigation ranging) are examples of systems that detect pulsed energy in the presence of background noise. Radar terminology is used throughout the present, although the principals and techniques apply to a wide variety of applications.

These and other objects, features, and advantages of the present invention will become more apparent when considered in connection with a detailed description of preferred embodiments, which are illustrated in the accompanying drawing figures. This summary does not limit the invention, which is instead defined by the appended claims.

BRIEF DESCRIPTION OF THE DRAWING FIGURES

The present invention may be more completely understood by referring to the detailed description of a preferred embodiment and considering the drawing figures where like reference characters represent like parts:

FIG. 14 shows an exemplary output data format for pre-detection data, with compressions applied according to an embodiment of the present invention;

FIG. 15 shows eight packet formats used in a matched detector channelizer with adaptive threshold, according to an exemplary embodiment of the present invention;

FIGS. 20A-20C illustrate an operation of a bandwidth detection scheme according to an exemplary embodiment of the present invention;

FIG. 21 is an comparison plot of detection performance over a range of pulse widths versus signal power to noise density ratios, comparing the performance of a conventional receiver and the performance of an exemplary embodiment of the present invention;

Figure 27:
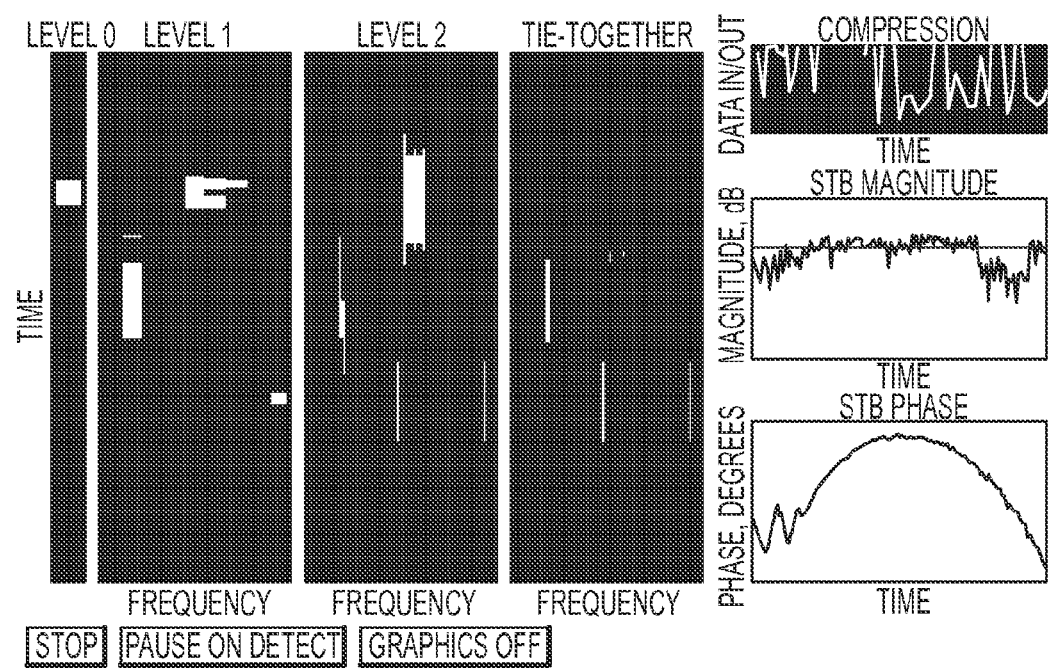
Figure 28:
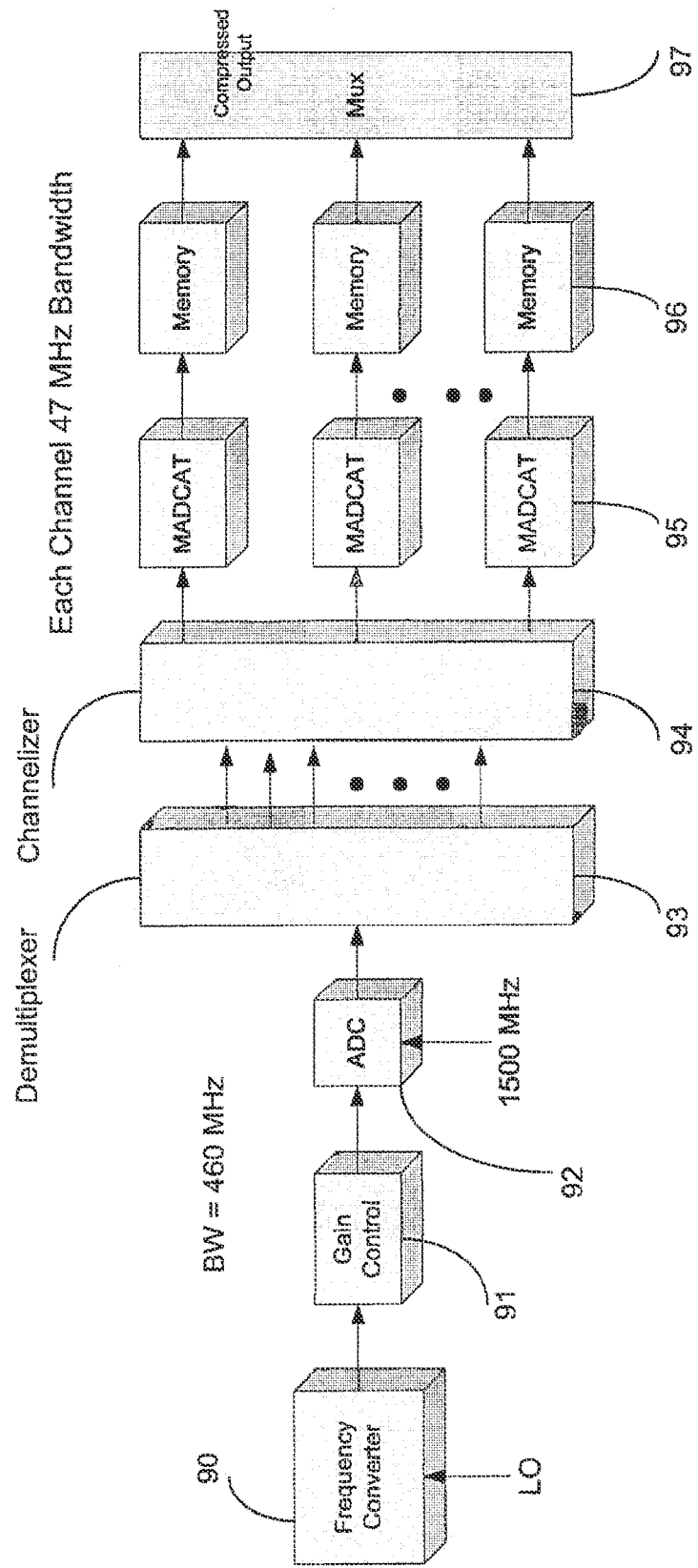

FIG. 27 illustrates a falling raster image display for monitoring various levels in an exemplary embodiment of a matched detector channelizer according to the present invention; and, FIG. 28 illustrates an exemplary use of a matched detector channelizer with adaptive threshold, in a system that may be implemented using parallel ASIC devices in a wideband digital receiver, according to an embodiment of the present invention.

DETAILED DESCRIPTION

Architecture associated with the preferred embodiment of the present invention is herein be referred to as a MAtched Detector Channelizer with Adaptive Threshold (MADCAT). Such a MADCAT system provides a near-matched bandwidth detection, capable of detecting a wide variety of signal types and pulse widths with high sensitivity. The detected signals may include non-modulated, simple modulated, linear frequency modulated (FM), binary phase shift keying (BPSK) signals, and others, alone or in various combinations of signal types.

Figures 1A, 1B:
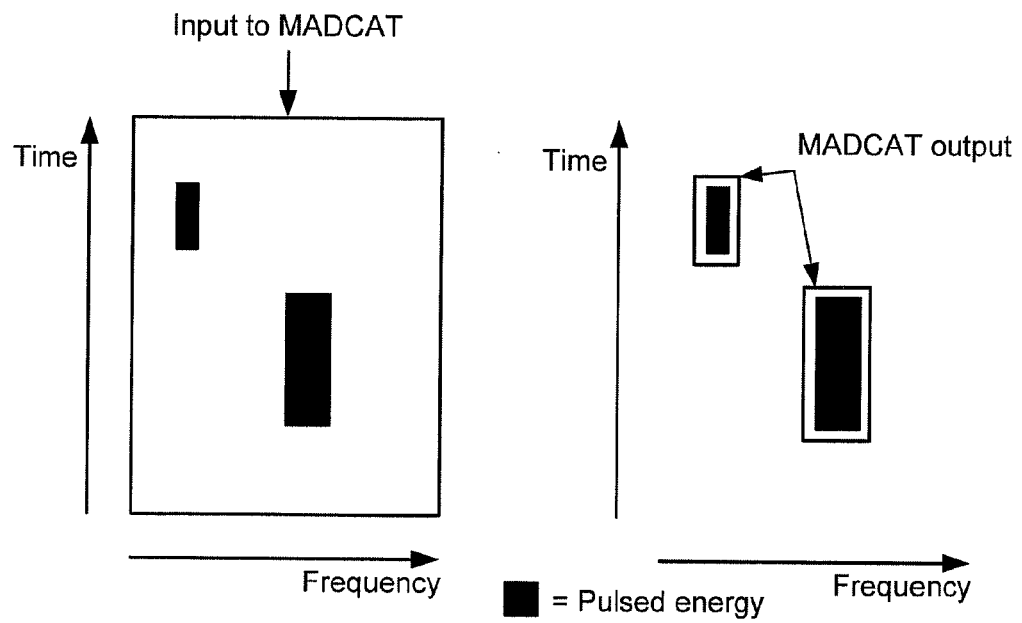
FIGS. 1A and 1B show a time versus frequency comparison of an input and an output for a matched detector channelizer with adaptive threshold, according to an exemplary embodiment of the present invention.

The MADCAT methods provide fine channelization by detecting and determining the temporal and spectral extent of signals of potential interest within particular frequency band(s). MADCAT is optimized for detecting pulsed energy in the presence of noise. Referring to FIG. 1, the input to the MADCAT, as shown on the left side of the Figure, is a digitized waveform. The MADCAT processes this waveform and determines whether pulsed energy is present. When pulsed energy is found, a packet of information is created that contains most of the information present in the pulsed energy. The detection process serves at least two general purposes. First, by determining when pulsed energy is present, information in a MADCAT packet specifies the time and frequency region where energy was detected. Second, selection of the digital waveform in the region surrounding the pulsed energy allows further processing and/or measurements to be performed on the pulsed energy.

The output waveform, as shown on the right side of FIG. 1 is a much smaller volume of data compared with the input data. The input to MADCAT is a stream of data that is obtained from sampling at a sufficient rate to properly characterize a specific frequency range. The MADCAT output data streams characterizes the pulsed energy and effects a description of regions where energy was detected. The areas of the input waveform that are found to not contain pulsed energy are discarded. This operation results in compressing the data stream.

Figure 2:
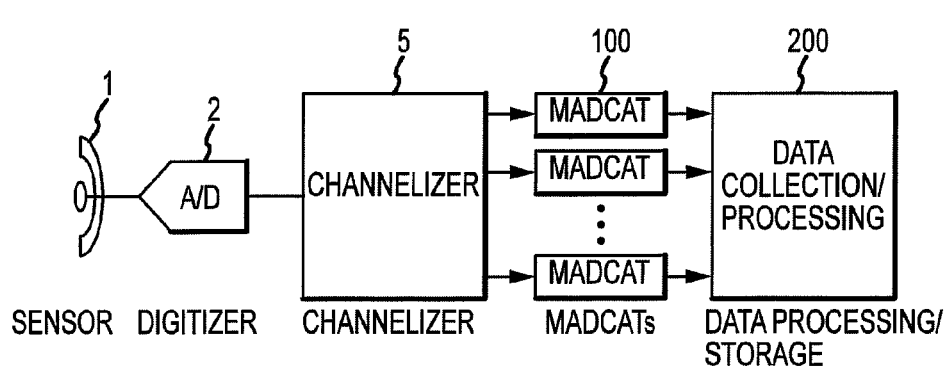
FIG. 2 shows an exemplary application for a matched detector channelizer with adaptive threshold according to an embodiment of the present invention.

FIG. 2 illustrates an exemplary application that uses MADCATs. A sensor 1 collects the information to be processed. The sensor 1 can be an antenna for collecting electromagnetic signals, such as for, e.g., radio or radar, a photodetector for detecting optical signals, a microphone or transducer that responds to acoustic signals, such as those traveling through air (e.g., sound), water (e.g., sonar), or solids (e.g., geophysical exploration). The signal from the sensor 1 is then digitized by an analog-to-digital (A/D) converter 2 to produce a digital waveform. A channelizer 5 then channelizes the digital waveform, by frequency, into one or more channels of information. Each of these channels is then processed by a MADCAT 100. The output(s) of the MADCATs 100 are then processed and/or stored by a data collection and processing system 200.

The MADCAT provides detection sensitivity within a few decibels of the theoretical limit for unmodulated pulses, over the frequency range of a channel, and for a large range of pulse widths. The output packets from a MADCAT are compressed, relative to the data rate of the channel, by selection of data in a time and frequency region around detected pulses, and through lossless data compression techniques. High sensitivity is achieved through the use of sub-channelization, detection, and integration of the data stream. Compression is achieved by sub-channel selection, tie-together logic, and data formatting.

Detection

Figure 3:
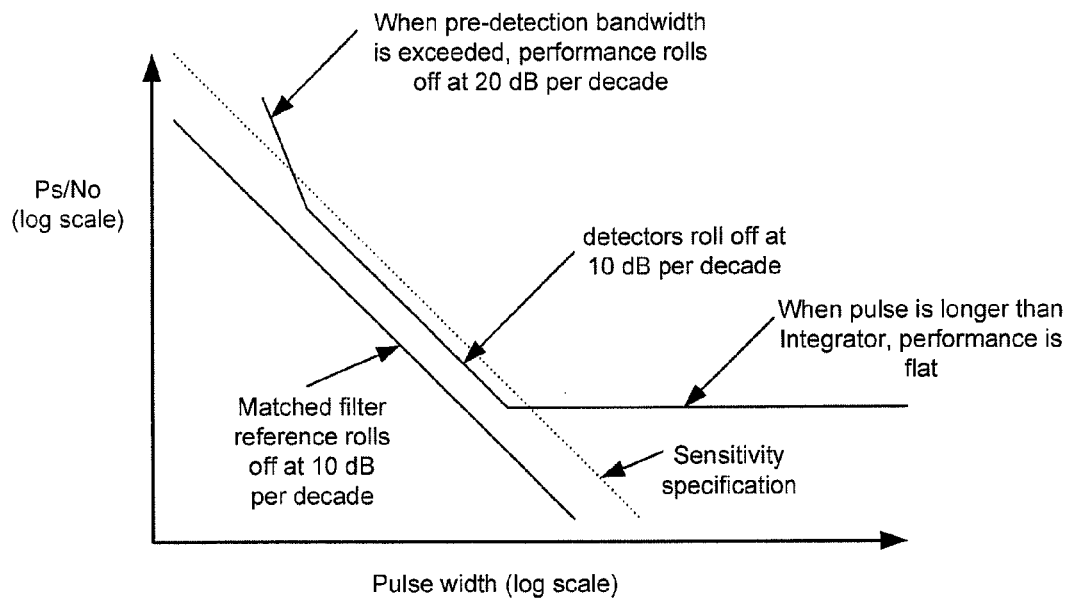
FIG. 3 shows the performance of a detector as a function of pulse width, for describing detector law performance.

An exemplary detector law performance is illustrated in FIG. 3. To achieve good detection performance, a channel being input to the MADCAT is sub-channelized. The number of sub-channels is determined by how much bandwidth and pulse width range is able to be covered by a single detector. The minimum pulse width is determined by the bandwidth of the sub-channel. Pulses having a pulse width shorter than this minimum pulse width have a significant portion of their energy outside the sub-channel, which degrades performance. Pulses having a width that is longer than this minimum have essentially all of their energy in-band, but this can let in too much noise as the pulse width becomes longer. As a result, the preferred pulse width is maintained within a relatively short pulse width range. As shown in FIG. 3, no further performance increase occurs when the pre-detection pulse width reaches a maximum length corresponding to the length of an integrator used in a subsequent integration.

Non-coherent integration improves the pulse width performance of the sub-channel detector. A detection law is applied to the signal, which then is processed by a video filter. In the preferred embodiment, the video filter is an integrator, which adds up a fixed number of detected samples. The output of the video filter is compared against a threshold to determine the presence of pulse energy. The detection and integration operations are optimized for achieving a high level of MADCAT performance.

FIG. 3 shows the performance of a detector as a function of pulse width. The matched filter reference line is based only on pulse energy and noise density. For every factor of ten increase in pulse width, a ten dB decrease in signal-to-noise (S/N) density for detection is produced. The reference line represents a constant pulse energy. As shown, the MADCAT detector has a region that parallels the matched filter reference line.

An exemplary MADCAT utilizes an integrator length of ten taps (N), which provides 1.8 dB of integration loss. This combination is chosen, for example, so that only two levels of sub-channels are needed. In such a case, the input to the MADCAT is processed with the detector/integrator as an additional level of sub-channelizing. Such a three-level design yields good sensitivity over three orders of magnitude of pulse width. The lower end of the pulse width range is determined by the bandwidth and sample rate of the MADCAT input, for example approximately sixteen nanoseconds. In the exemplary embodiment, the levels in MADCAT are spaced factors of nine apart in order to provide an overlap region in pulse width between levels, which in this example puts the upper end of the pulse width range at approximately thirteen microseconds.

Figure 4:
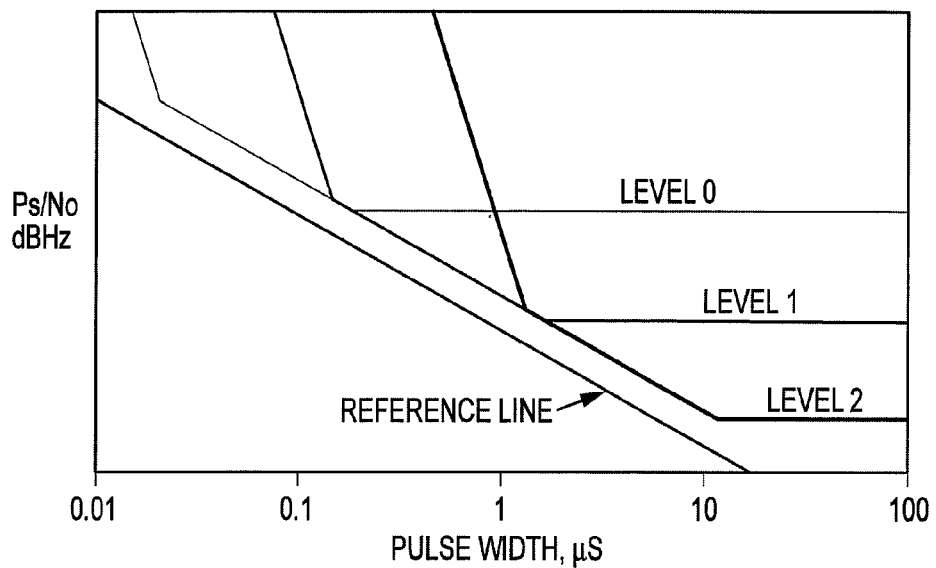
FIG. 4 shows a detection structure of an exemplary embodiment of the present invention, viewed in terms of detector law performance.

FIG. 4 illustrates by non-limiting example the detection structure used in MADCAT. Level 0 provides detection for pulse widths from 0.016 through 0.16 microseconds. Level 1 provides detection for pulse widths from 0.14 through 1.4 microseconds. Level 2 provides detection for pulse widths from 1.3 through 13 microseconds.

Sub-Channelization

The FIG. 4 example establishes the pulse width range of a detector as a 10:1 ratio. In order to detect pulses longer than 0.16 microseconds, smaller bandwidths and lower sample rates are required for inputs to the detectors. A sub-channelizer breaks the channel up into narrow bandwidths for detection, noise estimation, and output generation.

Figure 5:
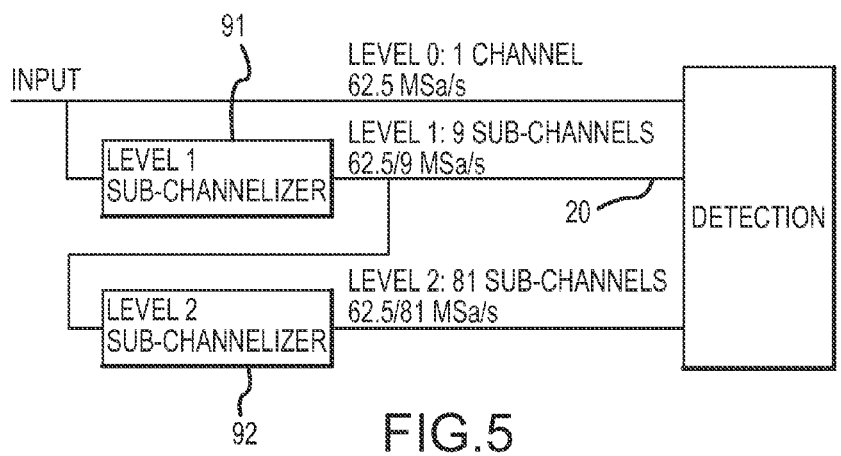
FIG. 5 shows a sub-channel architecture for a matched detector channelizer with adaptive threshold, according to an exemplary embodiment of the present invention.

FIG. 5 is a block diagram of an exemplary MADCAT sub-channelizer architecture. The input to the MADCAT is used directly as Level 0, and is split into twelve sub-channels as Level 1. Of the twelve sub-channels, only nine have useful information. These nine sub-channels are each decimated by nine, producing a data rate equal to the input data rate. The output of Level 1 is time-multiplexed onto a single data bus 20. The Level 1 output is used in the detection and noise estimation processes and serves as the input to the Level 2 sub-channelizer 92. Level 2 outputs are produced by splitting each Level 1 output into twelve sub-channels, where only nine of the twelve sub-channels contain useful information. The Level 2 outputs are decimated by nine, producing 81 sub-channels at 1/81 of the MADCAT input sample rate, and are time-multiplexed onto a single data bus. The Level 2 outputs are used in the detection, noise estimation, and output packet generation processes. The Level 2 sub-channelizer 92 is cascaded with Level 1 to reduce power consumption. Each of the sub-channelizer blocks 91, 92 in FIG. 5 comprises two cascaded 3 of 4 sub-channelizers, reducing the gate count required to implement the sub-channelizers.

An object of the sub-channelizer design is to reduce size (e.g., gate count) and power consumption. A major factor in achieving size reduction is implementing the sub-channelizers as transmultiplexers. Another object is the achievement of size reduction in the design and implementation of prototype filtering. A transmultiplexer is used to efficiently implement uniform filter banks, where a bank of filters implements an inverse discrete Fourier transform (IDFT) for a cost of one filter, the prototype filter. Each of the resulting filter outputs has a frequency response identical to that of the prototype filter, at uniformly distributed center frequencies.

Maximally decimated filter banks are known, e.g., P. P. Vaidyanathan, "Multirate Digital Filters, Polyphase Networks, and Applications: A Tutorial", Proceedings of the IEEE, vol. 78, pp 56-93, January 1990, incorporated herein in its entirety. In this publication, filter banks have M channels, where each channel is decimated by M. The filter banks effect simplified polyphase filters, and can be designed to have "perfect reconstruction" by a suitable synthesis filter bank. Ideally, such a system is only subject to quantization effects in the filters.

The MADCAT is an 'oversampled filter bank,' where the outputs are decimated by less than the number of sub-channel outputs, e.g., twelve sub-channels, decimated by nine. This results in a higher output data rate compared with a conventional maximally decimated filter bank, but the MADCAT improves alias avoidance and frequency selectivity, and simplifies reconstruction because the MADCAT sub-channels contain the entire input spectrum, alias free. The prototype filter meets advanced frequency selectivity requirements while being easy to implement because the reconstruction process is not a complicating factor. A reconstruction filter bank is used for selecting the middle 'sweet spots' from each sub-channel, generating the reconstructed output. Since aliasing cancellation is not required, the preferred reconstruction filters are voltage complementary with adjacent filters. The crossover points for the reconstruction filters are the 6 dB points, so that a signal, which crosses sub-channels, is coherent with itself in the reconstruction process. As a result, the signal voltages add, not the signal powers.

By comparison with the above-mentioned Vaidyanathan reference, the MADCAT reconstruction process is not a perfect reconstruction. Some passband ripple occurs, and some images of aliased signal energy are present. When the sub-channelizer decimates, images of signals in the stopband are generated, and these images are attenuated by at least 60 dB. The reconstruction process does not attempt to cancel these images, but instead adds images during the upsampling process. However, the reconstruction filter bank has better stopband rejection than the sub-channelizer, so that the sub-channelizer's 60 dB of stopband rejection is the limiting factor in the frequency domain dynamic range. In addition, the MADCAT oversampled sub-channelizer can include cascading of sub-channelizer filter banks, which also helps to reduce power consumption.

Prototype Filter

The sub-channelizer provides maximal flexibility in the selection of the prototype filter, where important criteria are passband and stopband frequency ranges, passband ripple, and stopband rejection. Power consumption is reduced while meeting design goals.

Figure 6:
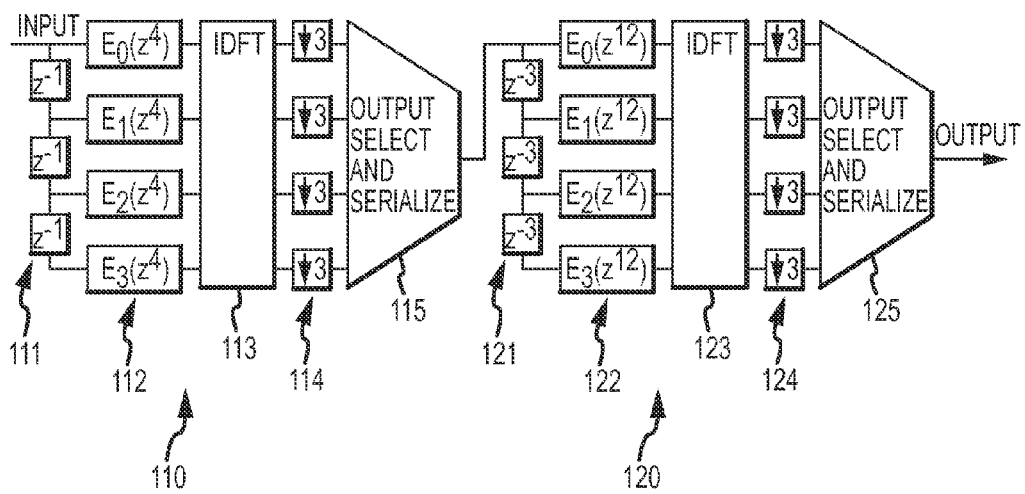
FIG. 6 shows an implementation of a cascaded series of 3 of 4 transmultiplexers for a matched detector channelizer with adaptive threshold, according to an exemplary embodiment of the present invention.

FIG. 6 illustrates an exemplary MADCAT implementation that uses a series of 3 of 4 transmultiplexers. Each of the 3 of 4 transmultiplexers 110, 120 effects an operation akin to that for sub-channelizers in a self-similar optimal detection (SO-DET) radar application. An input to the transmultiplexer 110 is fed to a filter bank 112 and also to a first delay of a bank of delay elements 111. The delays 111 are arranged in a cascaded fashion, whereby a delay output is fed to the filter bank 112 and also to the next delay in the bank of delay elements 111. The filter bank 112 has a plurality of individual polyphase filters for corresponding commutators. The outputs of the filter bank 112 are fed to an inverse discrete Fourier transform (IDFT) processor 113. The corresponding outputs of the IDFT 113 are fed in to decimators 114, and the respective outputs of decimators 114 are fed to a combiner 115 that selects and serializes the decimator outputs in order to obtain a combined output. The output from transmultiplexer 110 is used as the input to transmultiplexer 120. The transmultiplexer 120 is arranged in a same manner as for transmultiplexer 110.

An IDFT of order 4 is generally a largest order that can be done using trivial multiplications. The transmultiplexers 110, 120 split their respective inputs into four sub-channels and only three of the sub-channels are retained. Each output is decimated by three, yielding a combined output data rate equal to the input data rate. An output data rate equal to that of the input data allows combining the output data onto a single data bus. The next transmultiplexer in the cascade operates on the combined data bus in a time-multiplexed fashion.

Figure 7:
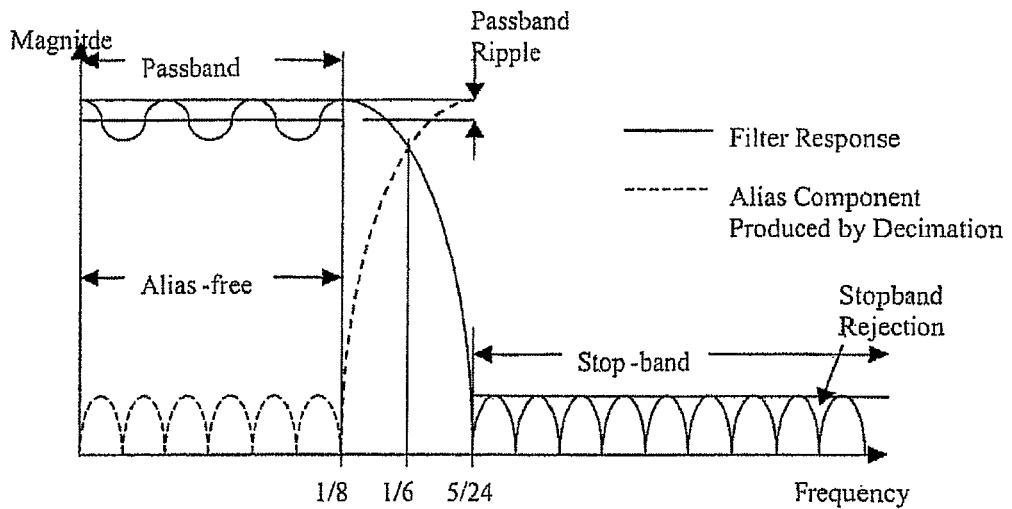
FIG. 7 shows prototype filter requirements for a transmultiplexer according to an exemplary embodiment of the present invention.

FIG. 7 illustrates the prototype filter requirements for a 3 of 4 transmultiplexer. The passband width is one-quarter of the input sample rate. FIG. 7 only shows filter requirements for positive frequencies, but negative frequency response is identical. Since the passband must remain alias-free, the stopband is required to start at $5/24$ of the input sample rate. Stopband rejection is required, for example, to be at least 58 dB, and passband ripple is required, for example, to be less than 0.015 dB.

The Remez exchange technique, as implemented by Parks and McClellan, is a well-known method for approximating a finite impulse response (FIR) linear phase filter. The Parks-McClellan algorithm uses the Remez exchange algorithm and Chebyshev approximation theory to design filters with optimal fits between the desired and actual frequency responses. The filters are optimal in the sense that the maximum error between the desired frequency response and the actual frequency response is minimized. Filters designed this way exhibit an equiripple behavior in their frequency response, and hence are sometimes called equiripple filters.

Figure 8:
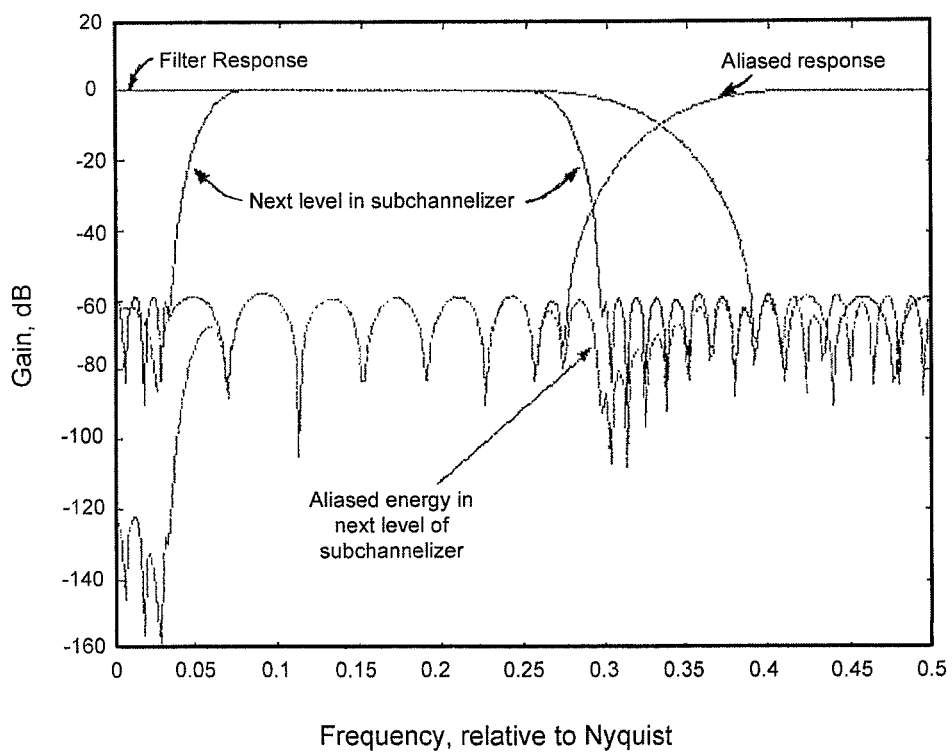
FIG. 8 shows a prototype filter response for a matched detector channelizer with adaptive threshold, according to an exemplary embodiment of the present invention.

In MADCAT, the Remez exchange technique is used to generate floating-point FIR coefficients that meet the criteria shown by example in FIG. 7. FIG. 8 shows the prototype filter response of the coefficients used by MADCAT. The coefficients are integers that are selected to have the overall lowest gate count for implementation. The coefficients are also symmetric, yielding perfectly linear phase response. In the example of FIG. 8, the passband extends to 0.25 and the stopband edge is chosen so that the aliased energy allowed into the sub-channels in the next level is attenuated by approximately 58 dB. Note that the passband edge used in the FIG. 8 example is a tighter restriction than that for FIG. 7. A similar propagation of aliased energy also occurs when filtering Level 2 data during the reconstruction process. Preferably, reconstruction filters have sharper edges than the sub-channelizer filters, so that the aliasing during the reconstruction process is less than for the sub-channelizer aliasing shown, for example, in FIG. 8.

Thresholding

Figure 9:
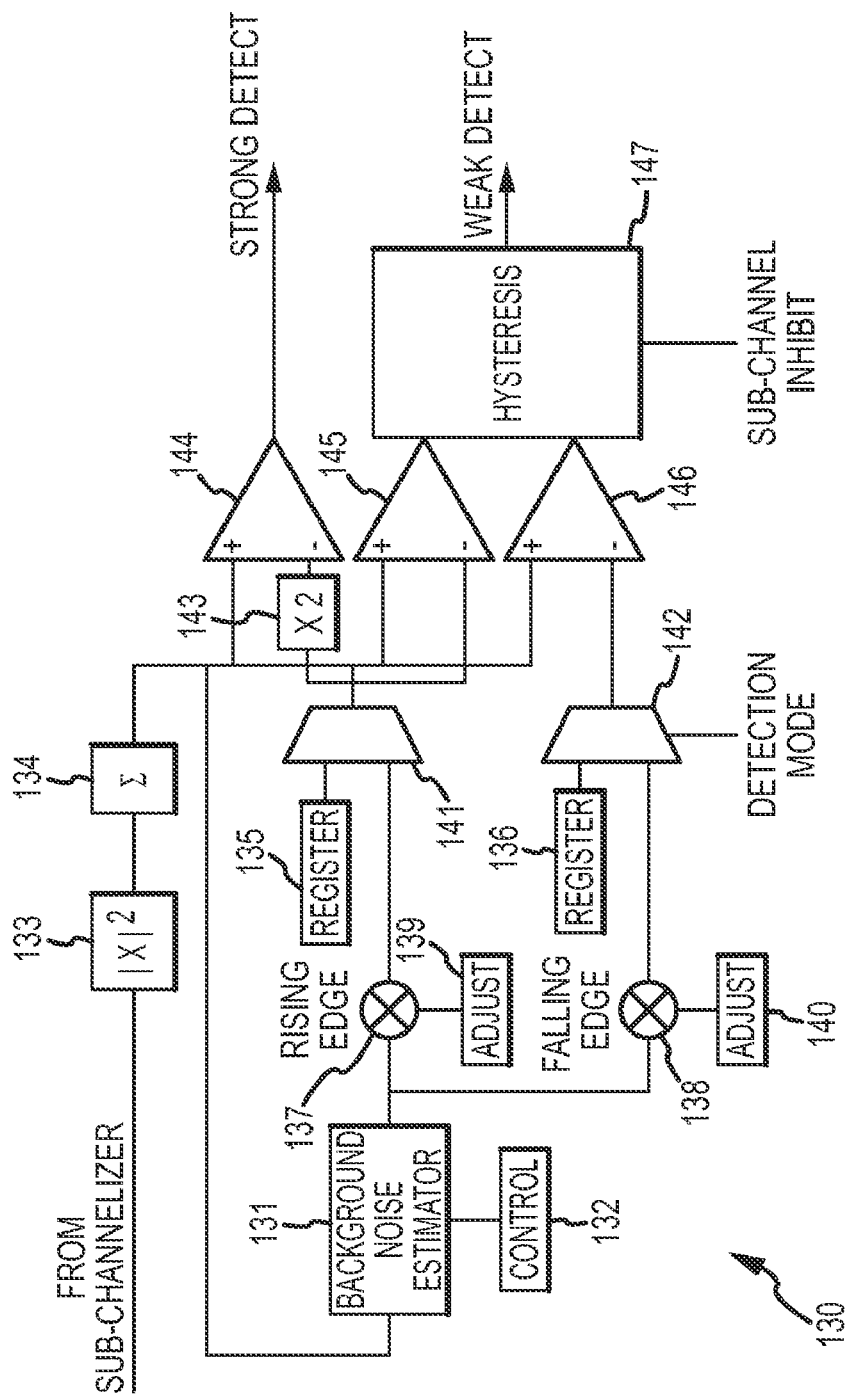
FIG. 9 is a shows thresholding logic used for a matched detector channelizer with adaptive threshold, according to an exemplary embodiment of the present invention.

A basic operation in MADCAT detection is comparing the output of a post-detection integrator with a threshold value, to determine when energy is present. The thresholding portion of the MADCAT augments this comparing operation with hysteresis and automatic threshold determination. FIG. 9 shows an exemplary thresholding logic configuration.

In FIG. 9, a signal from one of the sub-channelizations is fed to a detection circuit 130. The signal is fed both to absolute squarer 133 and to background noise estimator (BNE) 131. A control mechanism 132 is used to control various parameters of the BNE 131. The output of the BNE 131 is fed to both of the multipliers 137, 138. An adjustment mechanism 139 is connected to the multiplier 137 for adjusting a level of the BNE output. An adjustment mechanism 140 is connected to the multiplier 138 for providing the multiplicand of the BNE output. The adjusted BNE values go to the multiplexers 141, 142. The multiplexers have a fixed mode and an automatic mode of operation, which is determined by the detection mode input. The output from multiplier 137 is fed to multiplexer 141. The output from multiplier 138 is fed to multiplexer 142. Registers 135, 136 are used to hold threshold values for use in the fixed mode of operation, and provide this threshold value to the multiplexers 141, 142. In automatic mode, the multiplexers 141, 142 set the threshold relative to the noise estimate from the BNE 131. The output from multiplexer 141 is fed to a multiplier 143 that multiplies a threshold number coming out of multiplexer 141 by two, and to the inverting input of comparator 145. The output of multiplier 143 is fed to the inverting input of comparator 144. The output of multiplexer 142 is fed to the inverting input of comparator 146. Multiplexer 142 receives a detection mode control from an external control. The output of absolute squarer 133 is fed to integrator 134. The output of integrator 134 is fed to the non-inverting inputs of comparators 144, 145, 146 and to background noise estimator 131. The output of comparator 144 indicates whether the signal contains a strong detect. The outputs of comparators 145, 146 are fed to a hysteresis unit 147, which outputs a weak detect indication. The hysteresis unit 147 has a sub-channel inhibit control input that allows the hysteresis unit 147 to completely inhibit the weak detect output, so that a detect signal is not outputted.

In the FIG. 9 configuration, three comparisons are made on each integrator output. The leading edge threshold from multiplexer 141 determines the sensitivity and false alarm rate (FAR) of the MADCAT. By implementing hysteresis, the trailing edge threshold allows using a lower power level to detect the end of a pulse, reducing break-up of long pulses at low power levels. A value 3 dB higher than the leading edge threshold provides a strong signal indication that is used in a tie-together operation, described later below. The FIG. 9 configuration allows two modes of operation, a fixed mode and an automatic mode. The fixed mode uses two threshold values (e.g., leading, trailing) for each sub-channel. These threshold values are programmed prior to or during the processing of the input data. The use of at least two thresholds provides an accurate determination of a weak detect and/or a strong detect. In a preferred embodiment using the FIG. 9 configuration, the threshold for the 'strong detect' is set to be twice the amount for the 'rising edge' threshold of inputs.

Figure 10:
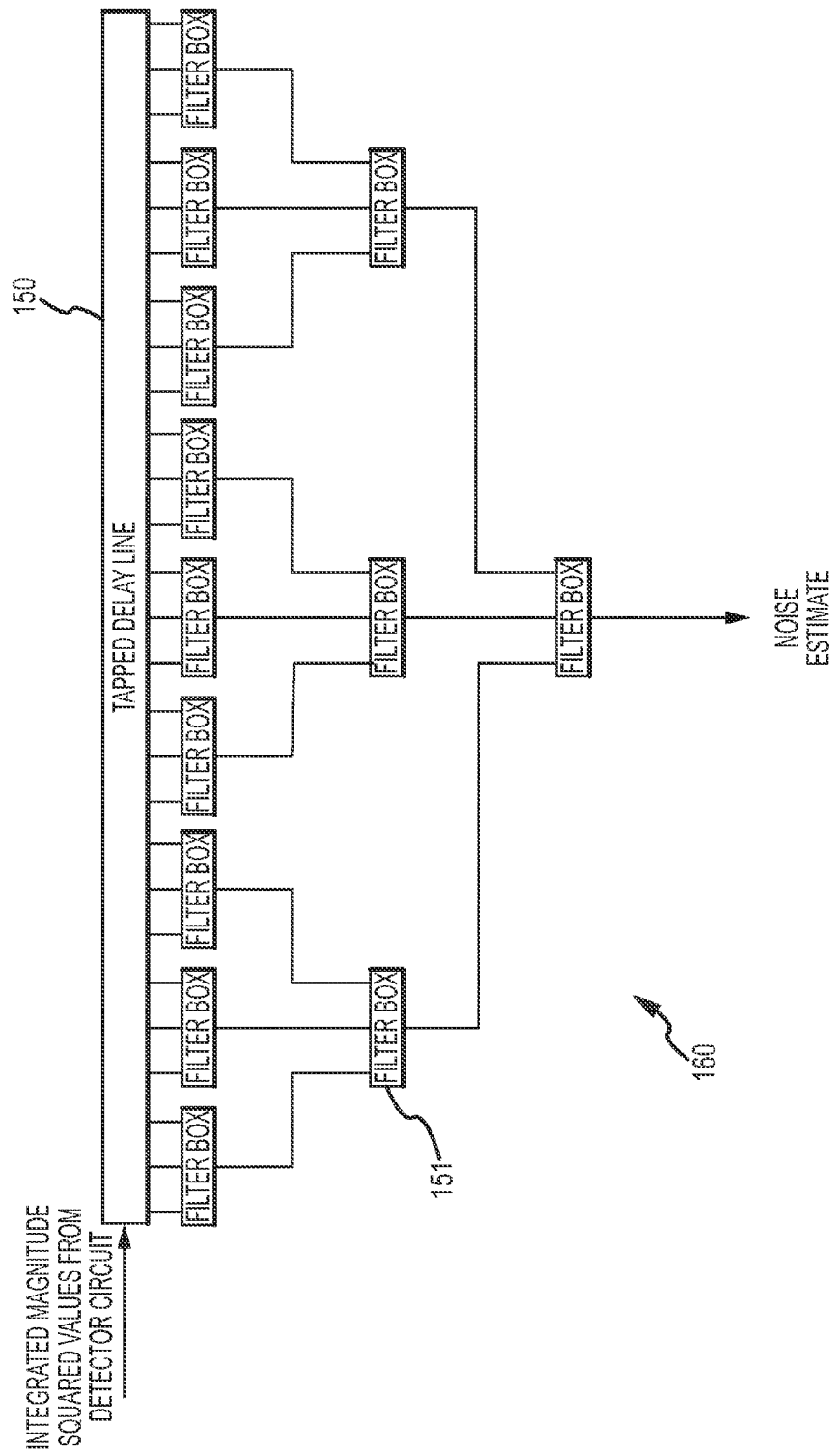
FIG. 10 shows a background noise estimation logic being implemented as a three-tier median filter structure, according to an exemplary embodiment of the present invention.

The fixed mode requires that the noise density in the input data be known or predetermined. The automatic mode utilizes a background noise estimator (BNE) 131 to automatically set the threshold values. The BNE 131 sets thresholds based on the noise density present in the input data. In order to tolerate pulsed energy during the noise estimation process, the BNE logic uses median filters, such as in the configuration shown in FIG. 10. A tree of median filters 160 processes output values from the post-detection integration. A tapped delay line 150 may be used for providing video filtered signals with different delays to the tree of median filters 160. The output of this operation is an estimate of the noise power level in the pre-detected data stream. The noise power level estimates are multiplied by programmable values to produce the values used by the comparators 144, 145, 146. The BNE logic runs continuously when the automatic mode is used, providing periodic noise estimates, e.g., every 350 microseconds. FIG. 10 illustrates an exemplary MADCAT BNE logic. Each filter box 151 in FIG. 10 examines the three inputs on its top side, and outputs the median value at its bottom side. The FIG. 10 configuration is a three-tier median filter that can be used for Level 2 of the sub-channelizer, with twenty-seven input values in the estimation process, thereby incurring a constant false alarm rate (CFAR) loss of 0.5 dB. Levels 0 and 1 utilize five-tier median filter structures with 243 input values, for a CFAR loss of 0.1 dB.

Power consumption is reduced using the detection integrator and by time multiplexing the median filters. The post-detection integrator output used for detection is the input to the median filter tree. The integrator performs a mean-of-noise-values operation that helps reduce the variance of the noise estimates without adding extra logic. By comparison, noise estimation that uses mean methods produces low variance noise estimates but is susceptible to corruption by pulse activity.

Cascading median filters also reduces power consumption. General k-order statistics may be used in a method for pulse activity rejection in noise estimating. A median filter is a special case of k-order statistics. The length of the filter required to provide low CFAR loss and good pulse activity rejection is greater than 20 taps, when taking advantage of the post-detection integrator. If the integrator were not used, the filter length would be more than 100 taps, which is difficult to implement directly. By cascading smaller filters, CFAR loss is increased only slightly, and implementation is made much simpler. An optimum k-order statistic in the direct implementation may be, for example, in the 60-75 percentile range. When cascading smaller filters, use of the mid-point, or median filtering, results in the best performance.

Tie-Together

The threshold logic produces two bits per sub-channel (e.g., weak detect, strong detect) in each level. The outputs from each level are based on the same periods of time and frequency position as outputs from other levels. Tie-together logic merges information from all three levels into a single set of detect/no-detect flags. Tie-together results are used in the selection of pre-detection ("pre-D") data for the MADCAT output.

Figure 11:
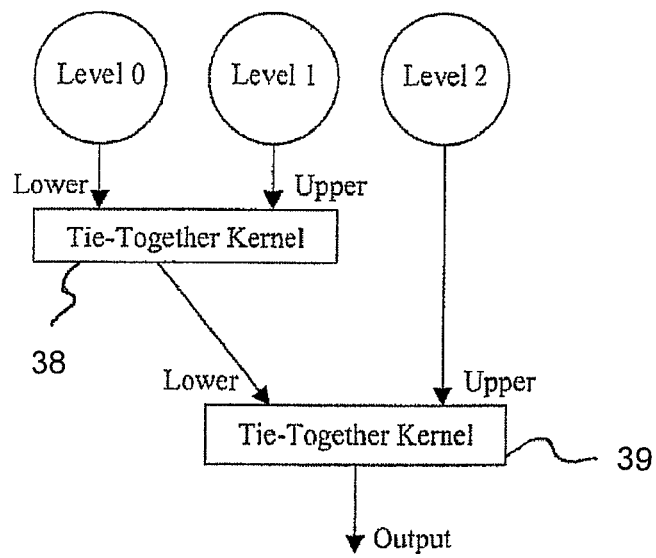
FIG. 11 shows the top-level organization of a tie-together structure, according to an exemplary embodiment of the present invention.

FIG. 11 shows the top-level organization of the tie-together configuration. Levels 0 and 1 are first combined to form an intermediate detect, which is then combined with Level 2. Both of the tie-together operations are identical processes. The upper level is combined with the lower level in each tie-together kernel 38, 39.

Figure 12:
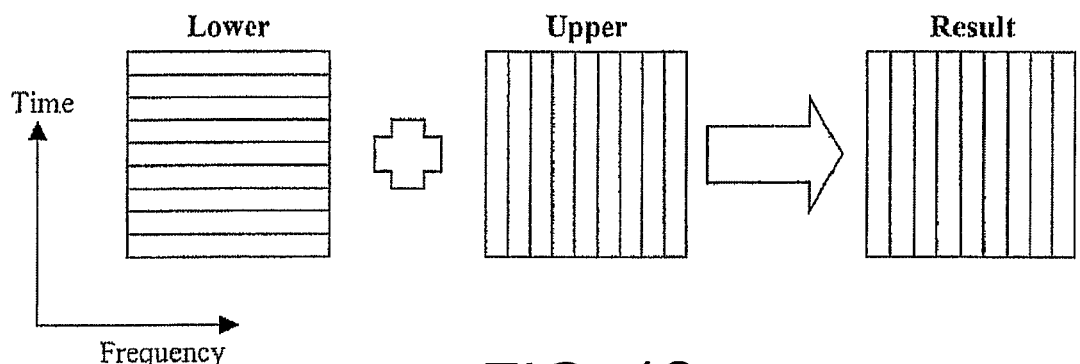
FIG. 12 shows the basic operation performed by a tie-together kernel, according to an exemplary embodiment of the present invention.

Tie-together combines detection information representing the same time and frequency ranges, as seen by detectors with different resolutions. FIG. 12 shows the basic operation performed by the tie-together kernels 38, 39 of FIG. 11. Each rectangle in FIG. 12 represents a 'detect' event, which can be 'none,' 'weak,' or 'strong.' The lower level has nine samples in time that represent the frequency span. The upper level has nine samples in frequency, representing the time span. The output of the kernels 38, 39 is nine samples in frequency, as for the upper level. Tie-together can have a large number of possible input conditions. Processing in the tie-together kernel operation of FIG. 12 begins by forming the maximum detect level of the nine upper level detects. This determines whether any 'strong' detects are present in the nine detects (max=strong), whether, if no strongs are found but 'weak' detects are present (max=weak), or whether 'no' detects are present at all (max=none). A similar process is performed on the lower level detects. For this example, the maximum detect level is determined, from each set, by taking a look at 9 samples from upper level and 9 samples from lower level. Table 1 provides a more detailed description of the actions the tie-together kernel takes, based on the maximum upper and lower detects, showing kernel outputs vs. maximum detect level. The output conditions are as follows:

None—all nine of the output detects indicate no detect.

Check for Integrator Stretching—an occurrence when the upper level has detected energy when the lower level has not. The upper level has a longer integrator than the lower level. It is possible that the upper level integrator has stretched a short but high power pulse. If this condition is preceded or followed by strong detects in both levels, integrator stretching is assumed, and the outputs are set to 'no' detects. If integrator stretching is not found, the output is set to the upper level inputs.

Flood—Activity is found in the lower level, but not enough information is available to determine the exact frequency limits. To be conservative, all nine output detects are set to either 'weak' or 'strong,' as indicated in Table 1.

Kernel Outputs vs Maximum of Inputs

TABLE 1

|  |  | Maximum Upper Level Detect | | |
|---|---|---|---|---|
|  |  | None | Weak | Strong |
| Maximum Lower Level Detect | None | None | Check for Integrator Stretching | |
|  | Weak | Flood Weak | Flood Weak | Upper |
|  | Strong | Flood Strong | Flood Strong | Upper |

Upper—The upper level has stronger detects than the lower level. The nine output detects are set to correspond to the same frequency ranges as the nine input detects from the upper level.

Table 1 shows the behavior of the preferred tie-together hardware. The following discussion describes the same operations in more general terms.

The most straight-forward tie-together condition is when exactly one of the tie-together levels detects an event. In such an instance, the tie-together output simply reformats the detect in the time/frequency spacing of level 2, where 81 sub-channels of frequency provide a time resolution of 1.296 microseconds (e.g., for sampling at 62.5 MHz, for every 81 inputs there is an output; there is a spacing of 1.296 microseconds coming out of level 2). A more complicated input condition is when more than one level detects activity in the same time/frequency space. If both levels are reporting 'weak' detects, then the tie-together forms the union of the detects. This generates more output data, but also preserves information from barely detected signals. If only one of the levels indicates a 'strong' detect, then the tie-together output is primarily created from the level with the 'strong' detect. When more than one level is indicating a 'strong' detect, then the tie-together attempts to form an output that is the intersection of all the levels with 'strong' detect. There are limits to the intersection determination. For time, Level 2 has a long integrator compared with Level 1 and can indicate detects for a longer time than the actual pulse width. The integrators on all three levels are preferably each 10 taps long. Level 2's integrator covers a longer period of time because Level 2 runs at a slower clock rate. For example, Level 2 runs at 1/81 of the input clock rate and Level 1 runs at 1/9 of the input clock rate. A short event with high amplitude can be stretched up to ten frames by the integrator. This stretching operation adds up to five frames before and after the actual pulse. In correcting integrator error, tie-together only shortens a Level 2 detect by a maximum of, e.g., ten 1.296 microsecond frame times, five frames on each of the leading and trailing edge.

For frequency determination, if the level with coarse frequency resolution has a detect, tie-together checks to see if a 'strong' detect is found on the next level at a frequency within the coarse frequency range. For example, for Level 0, this means there is a 'strong' detect in Level 1. For Level 1, this means that only the nine Level 2 sub-channels derived from the respective Level 1 sub-channel qualify for this operation. When a qualifying 'strong' detect is found, the finer frequency resolution information is used in the tie-together output.

Pre-D Collection

Pre-D collection is the process of separating detected energy from the surrounding noise in both time and frequency. Sub-channel reconstruction uses the Level 2 sub-channelizer as its source of pre-D. Sub-channels are gated on and off as determined by the tie-together result. The individual sub-channels are reconstructed to form the composite waveform. Features of the sub-channelizer that simplify reconstruction are channel overlap and oversampling. These features enable the sub-channelizer to allow cascading of sub-channelizer elements. Each sub-channel output has a large-enough alias-free bandwidth to allow the next level to further sub-channelize the data, with no gaps in frequency coverage. This continuous, alias-free frequency coverage allows optimum sub-channel reconstruction.

Sub-channel reconstruction may proceed without a necessity of waiting for the end of a pulse before selecting particular sub-channels. The output from tie-together is padded in time and frequency to form detect bits. These detect bits are used to gate-off the selected pre-D samples, which can be done immediately after the detection operation has been performed. A short delay line between the Level 2 sub-channelizer and the packet formation process is required, only needing to compensate for the detection, integration, tie-together, and padding delays. There is no need to compensate or account for sub-channelizer delay and longest pulse delays, since the MADCAT does not use sub-band tuning Compression A fundamental operation performed by the MADCAT is the representing of an entire section of the radio frequency (RF) environment, by using only a portion of the input data. This is achieved by only sending digital data samples in the time and frequency regions around detected pulses. MADCAT also utilizes several other compression techniques.

Compression techniques are conventionally divided into lossless and lossy, depending on whether or not the original signal can be exactly reconstructed in a subsequent process. Lossless techniques take advantage of redundancies in the input data stream. Lossy techniques allow a certain amount of degradation to occur in areas that will not cause a large effect on the intended use of the data. Lossy techniques are generally more efficient and/or offer a higher performance compared with lossless techniques. The preferred MADCAT embodiment performs all compression in hardware. The MADCAT utilizes both lossy and lossless compressions.

The MADCAT performs one type of lossy compression, pre-D selection. This compression utilizes pre-detection data that is obtained from the Level 2 output of the sub-channelizer. The data is complex, consisting of in-phase/quadrature (I/Q) pairs. With an eight-bit input (10 bit output from the channelizer), the MADCAT produces 13 bit I and 13 bit Q values. Pre-D selection determines which of these samples are saved. This compression operation uses multiple programmable settings that allow careful control of the degree of degradation that occurs. Since no signal can have a finite energy distribution in both time and frequency, the operation of selecting pre-D information around a pulse detect is a lossy one. By carefully selecting the time and frequency extents of the pre-D data that is saved, high-quality compression is achieved with very little loss of data fidelity.

The MADCAT controls the selection process with parameters for frequency padding and time padding. Frequency padding determines how many sub-channels above and below each detect are to be saved. The frequency padding operation is performed prior to the time padding. Time padding has two parameters, pre-cursor and post-cursor. The pre-cursor padding determines how many frames of data are included before each detect, and the post-cursor padding determines how many frames of data are included after each detect. Pre-cursor padding and post-cursor padding are applied to sub-channels after the frequency padding so that sub-channels added during the frequency padding will also have pre-cursor and post-cursor selection. There are two areas in the MADCAT where lossless compressions are applied, on the packet header structures and on the I/Q data samples. In order to reconstruct the original data stream from selected Level 2 I/Q data samples, the locations in time and frequency where the samples belong must be communicated to the reconstruction process. The output data stream is formed into packets. Each packet contains a header, indicating where the packet is in time, and where I/Q pairs are to be found in the latter part of the packet. Each packet represents a frame, which is a set of 81 sub-channels from Level 2 of the sub-channelizer. Each I/Q pair in a frame represents a different frequency, but all the I/Q pairs in the frame occur at the same time. If none of the I/Q pairs in a frame will be output, then no packet is generated.

Figure 13:
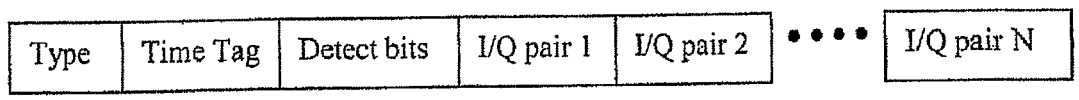
FIG. 13 shows an exemplary uncompressed packet structure, prior to compression being performed.

FIG. 13 shows the packet structure prior to compression. The packet type field indicates whether the packet contains pre-D data. The other type of packet is a BNE report that provides the background noise estimates for all 81 sub-channels. The time tag indicates which frame the data represents. A frame in the MADCAT is 81 input clock cycles long, with a time resolution of 1.296 microseconds. The detect bits indicate which I/Q pairs will be present in the latter part of the packet. The detect bits field is 81 bits long. When the I/Q pair is present, the corresponding detect bit is set to one. The I/Q pairs are complex samples from the Level 2 pre-D outputs. In the uncompressed packet, 13 bits are used for I and 13 bits are used for Q. A series of compression techniques are applied to this packet structure.

A compression removes the time tag when the preceding frame generated a packet. A new packet type indicates that this packet contains no time tag, the time tag for this packet being one higher than the previous packet. When no activity is present in the frame, the MADCAT will not generate a packet. The next packet must then contain a time tag.

In a typical MADCAT application using selected real data files, first-order Markov statistics were generated on the detect bits as a function of time, resulting in a 90% occurrence of a frame with activity being preceded by another frame with activity. Analysis of selected real data files indicates that the detect bits are unchanged from the previous packet about 75% of the time. A single bit is added to indicate that the current packet's detect bits are identical to the previous packet. When this 'delta frame encoding' bit is set, the detect bits are not present; otherwise the detect bits are included.

When it is necessary to send the detect bits, a form of run-length encoding is used. A run is a contiguous series of adjacent I/Q pairs, all of which are selected for output. Usually, just a few runs of detect bits are encountered within a frame. Instead of sending all 81 detect bits, runs are encoded as a starting position, a Huffman encoded run length, and a bit to indicate whether the present run is the last one. The run start location is not encoded, as the center frequencies of the pulses are assumed to be uniformly distributed. The run lengths, being related to pulse width, show a distribution where smaller runs are more common. The tie-together process also effects this distribution. For example, in Level 1, detects with frequency padding are visible in run length histograms, and a trend was determined using selected real data file statistics. As a result, smaller codes were assigned to more common run lengths using Huffman encoding. Analysis of the number of runs in each frame showed a rapidly decreasing probability with an increasing number of runs. If the number of runs in a packet was Huffman encoded in a conventional manner, the code lengths would be 1 bit code for 1 run, 2 bit code for 2 runs, 3 bit code for 3 runs, etc. By comparison, the MADCAT does not encode the number of runs in a packet, but instead has a bit in each start position/run length set that indicates if more sets are present, or if this is the last set. The MADCAT operation provides the same compression result as the Huffman encoded count of runs, but uses a simpler technique.

The above described compression techniques concern reducing the overhead of the packet header. The MADCAT also utilizes most significant bit (MSB) encoding for reducing the bits per I/Q sample. MSB encoding is lossless. In conducting performance analyses of selected real data files for the MADCAT and analysis of pulse counts versus power level histograms for various other systems, the present inventor determined that more pulses are found at lower power levels. MSB compression takes advantage of this situation by reducing the number of bits per I/Q pair when the MSBs are not required. Instead of using 26 bits per pair (13 bits for I, 13 bits for Q), an encoded data size is sent, followed by an I/Q pair. The data size is Huffman encoded since the data size distribution favors smaller values. FIG. 14 shows the output data format for pre-D data, with the above-described compressions applied. Data in this format are observed at the MADCAT output, and are stored unchanged, for example, on a redundant array of independent disks.

FIG. 15 shows the eight packet types used in the MADCAT for one type of compression method. The different packet formats are automatically selected by the MADCAT hardware. A summary of the different fields used in the packets is shown in Table 2.

Field Summary

TABLE 2

| Field | Number of Bits | Description |
| --- | --- | --- |
| Packet Type | 3 | The first three bits of each packet indicate the packet type |
| Time long | 23 | Indicates the frame number the I/Q data in this packet represents |
| Time Short | 11 | Lower bits of the frame number |
| Run length | 1-23 | An encoded run length; implies size of run start |
| Run start | 0-7 | Which sub-channel a run starts on |
| L | 1 | 1 = This is the last run length/start; 0 = more runs follow |
| Sample size | 1-12 | Encoded size of the next I/Q pair |
| I | 1-13 | In-phase sample |
| Q | 1-13 | Quadrature sample |
| BNE XX | 32 | Background Noise Estimate for Level 2 sub-channel XX |

In the packet format diagrams of FIG. 15, the most significant bit (MSB) of a word is on the left-hand side, as shown in the packet format detail of Table 3.

Packet Format Detail

TABLE 3

| MSB | 32 bit CDI word | | LSB |
|---|---|---|---|
| 000 | MSB☐time field☐ LSB | MSB☐run length☐ LSB | MSB☐run start☐ LSB ... |

When packing information into 32-bit words to be used by, for example, a command and data interface (CDI), the MAD-CAT continues a field that is not completed at bit 0 of a CDI word, starting at bit 31 of the next CDI word. Packet types 0-5 all represent pre-D data (I/Q sample pairs) as well as additional information regarding the locations of these samples in time and frequency.

Packet type 1 shown in FIG. 15 will now be described. The other pre-D packets are subsets of the type 1 packet. The 'time long' field is the frame number that the packet represents. A frame is the amount of time required for the MADCAT to create an entire set of sub-channelizer Level 2 outputs. This is preferably 81 clock cycles, which at 62.5 MHz effects a time resolution of 1.296 microseconds. The first frame containing valid data is frame 0, and the next frame is frame 1. Frame 0 represents the first frame of non-zero data from the Level 2 sub-channelizer. Frame 0 comes out of the sub-channelizer at a time that is earlier than the delay of the filters would indicate, appearing to precede the MADCAT input data. Frame 0 contains "ramp-up" data created by the FIR filters in the sub-channelizers.

Regarding the run length field, in order to determine which Level 2 sub-channel a particular I/Q sample pair represents, a set of detect flags are employed. The detect flags consist of 81 bits that represent sub-channel 00 (the most negative frequency) through sub-channel 80 (the most positive frequency). If a bit in the detect flags is set to 1, then the I/Q sample for that sub-channel is in the latter portion of the packet. Otherwise, no I/Q pair is included. The number of bits set in the detect flags determines how many I/Q pairs are in the packet, where the order of I/Q pairs proceeds from the lowest sub-channel to the highest. In order to compress the packet, detect flags are not sent directly but, instead, are described in terms of runs, which are contiguous strings of detect flags set to 1. A run has a start position and a run length. In order to provide more compression, the run start fields may be shared between two run lengths. Table 4 shows a run start combining arrangement.

Run Start Encoding

TABLE 4

| Run Length | Possible start Positions | Combine with Code for run length | Other run length Start positions | Total start bit Combinations | Run start Address field length |
|---|---|---|---|---|---|
| 1 | 81 | 35 | 47 | 128 | 7 |
| 2 | 80 | 34 | 48 | 128 | 7 |
| 3 | 79 | 33 | 49 | 128 | 7 |
| 4 | 78 | 32 | 50 | 128 | 7 |
| 5 | 77 | 31 | 51 | 128 | 7 |
| 6 | 76 | 30 | 52 | 128 | 7 |
| 7 | 75 | 29 | 53 | 128 | 7 |
| 8 | 74 | 28 | 54 | 128 | 7 |
| 9 | 73 | 27 | 55 | 128 | 7 |
| 10 | 72 | 26 | 56 | 128 | 7 |
| 11 | 71 | 25 | 57 | 128 | 7 |
| 12 | 70 | 24 | 58 | 128 | 7 |
| 13 | 69 | 23 | 59 | 128 | 7 |
| 14 | 68 | 22 | 60 | 128 | 7 |
| 15 | 67 | 21 | 61 | 128 | 7 |
| 16 | 66 | 20 | 62 | 128 | 7 |
| 17 | 65 | 19 | 63 | 128 | 7 |
| 18 | 64 | | | 64 | 6 |
| 36 | 46 | 64 | 18 | 64 | 6 |
| 37 | 45 | 63 | 19 | 64 | 6 |
| 38 | 44 | 62 | 20 | 64 | 6 |
| 39 | 43 | 61 | 21 | 64 | 6 |
| 40 | 42 | 60 | 22 | 64 | 6 |
| 41 | 41 | 59 | 23 | 64 | 6 |
| 42 | 40 | 58 | 24 | 64 | 6 |
| 43 | 39 | 57 | 25 | 64 | 6 |
| 44 | 38 | 56 | 26 | 64 | 6 |
| 45 | 37 | 55 | 27 | 64 | 6 |
| 46 | 36 | 54 | 28 | 64 | 6 |
| 47 | 35 | 53 | 29 | 64 | 6 |
| 48 | 34 | 52 | 30 | 64 | 6 |
| 49 | 33 | 51 | 31 | 64 | 6 |
| 50 | 32 | | | 32 | 5 |
| 65 | 17 | 67 | 15 | 32 | 5 |
| 66 | 16 | | | 16 | 4 |
| 68 | 14 | 80 | 2 | 16 | 4 |
| 69 | 13 | 79 | 3 | 16 | 4 |
| 70 | 12 | 78 | 4 | 16 | 4 |
| 71 | 11 | 77 | 5 | 16 | 4 |
| 72 | 10 | 76 | 6 | 16 | 4 |
| 73 | 9 | 75 | 7 | 16 | 4 |
| 74 | 8 | | | 8 | 3 |
| 81 | 1 | | | 1 | 0 |

The first run length is implied by the run start being in the lower set of addresses. The higher addresses represent the second run length, and the start address is the one's complement of the run start field. The actual code used to represent the run length is a variable length code uploaded to the MAD-CAT. Access to or knowledge of the code table is required to interpret pre-D packets. The codes are preferably generated using Huffman encoding techniques.

There are two forms used for the run start field. The first form is simply the starting sub-channel of a run, and the second form allows sharing of a run length code. For example, a run length of one can start at 81 possible positions (sub-channels 0 through 80). Using seven bits to encode the run start leaves 47 run start values that are unused, so these 47 values are used to represent another run length. The example in Table 4 uses a run length of 35, which has 47 possible start positions. The run starts for the second run length count backwards from the maximum value. In this example, a run length of 35 that starts at sub-channel 0 is given a binary code value of 111 1111. This amounts to creating the one's complement of the start address. The uncompressor identifies the run length code, which has an associated run start size. In this example, seven bits are used for the run start size. The seven bit value is examined and a value of 80 or less indicates a run length of 1. If the value is larger than 80, the second run length of 35 and an inverted run start value are indicated. This somewhat complicated scheme improves compression by eliminating wasted run start addresses and shortens the code table. By combining run lengths, all combinations of run start addresses are used without redundancy. This also shortens the number of run length codes that are required. By reducing the code table to approximately half the number of entries, one bit per code is saved. It is noted that the sharing of run length codes is optional. Each run length can be assigned a unique value so that inverting of start addresses is not used. The run length codes are stored in RAM, set using initialization commands. These codes are optimized based on pulse statistics in the RF environment, and Huffman codes can be used as long as the 23-bit maximum code length is observed. Software tools can be used to provide generation of run length statistics from output data. From these statistics, new code tables can be generated.

The number of bits in the I and Q samples are encoded into the variable-length sample size field. As with the run size, the sample size field contains codes uploaded to the MADCAT. The code for the sample size field is preferably generated using Huffman encoding techniques. An additional constraint on the length of the sample size codes is that the sum of the sample size code and the I/Q values must not exceed 32 bits. The code for 13 bit I/Q data must be 6 bits or less, code for 12 bit I/Q data must be 8 bits or less, code for 11 bit I/Q data must be 10 bits or less, etc. Since the worst-case encoding for 13 items is 12 bits, there is no restriction of sample size codes for I/Q sizes of one to ten bits.

Pre-D data values are the Level 2 sub-channelizer outputs, with MSB compression. MSB compression removes the most significant bits, which are identical to the sign bit. The encoded I/Q size indicates how many bits are actually sent in the output. The reconstruction process sign extends each value to 13 bits, which is the maximum MADCAT output word size. Referring to the packet format description of FIG. 15, the type 0 packet is similar to the type 1 packet, except that the time field is only 11 bits long. The smaller time field reduces the packet size, and is used when the upper 25 bits of the time field are identical to the most recently sent type 1 or type 4 packet. The type 2 packet is used when the preceding frame generated a packet. The time value for the type 2 packet is one higher than the preceding packet. Whenever there is a gap in frame activity, the next frame containing detect activity must be a packet type with a time field. The type 3 packet is similar to the type 0 packet, except that no detect flag information is sent, and the detect flags are identical to the previous packet. The type 4 packet is similar to the type 1 packet in that each has a long time field, but differs in that no detect flag information is sent, and the detect flags are identical to the previous packet. The type 5 packet is similar to a type 2 packet in that each has no time field, but differs in that no detect flag information is sent, and the detect flags are identical to the previous packet. The type 6 BNE packet indicates the results of BNE operations. The type 6 BNE packet is not bit packed and the packet is padded out to 32 bits, each BNE value occupying 32 bits. Each type 6 packet starts and stops on 32 bit word boundaries in order to aid interpretation of the packed bit stream, in the event synchronization is lost. Each BNE value is a pseudo-median of 27 detector output values. Each detector output is the sum of ten magnitude-squared values from the Level 2 sub-channelizer. When inserting random noise during the reconstruction process, each I and Q value should have a zero mean variant, with a variance of (BNE value)/20. Regarding the type 7 packet, fill bits are used to pad a sequence of packets out to a 32-bit boundary, in order to achieve a 32-bit alignment in preparation of sending a BNE packet, or the padding-out of a packet is performed to generate a final CDI packet at the end of processing.

Sub-Channel Reconstruction

The output data stream contains selected I/Q values from the Level 2 sub-channelizer. Processing of the signals contained in the output requires putting the signal back into original form by using the reconstruction process. Sub-channel reconstruction is a process of recreating a channel from output information. Channel reconstruction is a process of recreating the original signal from a series of reconstructed channels.

The present description of sub-channel reconstruction assumes that the lossless compressions described above have been decoded. The lossy compressions cannot be undone, and some information must be substituted for the missing data. Reconstruction operations may be performed either in software or in a real-time hardware implementation. The output data stream is the result of previous sub-channelizing, decimation, and selection. The data samples that were not included in the selection process must be substituted-for in the reconstruction process. The reconstruction process has two modes of operation, substituting zero-valued data or substituting Gaussian noise. Zero-valued data is used when no further degradation of the output waveform is desired, and is the mode of operation preferably used in the MADCAT.

By comparison, Gaussian noise is generally used when reconstruction is being done for a system that assumes noise to be present in the input energy and that has software which expects to see a full spectrum of noise. In such a case, noise is added in a manner similar to zero-padding, because the software needs to have a steady noise floor to extract pulse parameters. By adding noise at frequencies not included in the output, the time domain waveform of a signal is changed. Since the added noise is not identical to the noise found in the original waveform, the reconstructed waveform is not identical to the original waveform.

Figure 16:
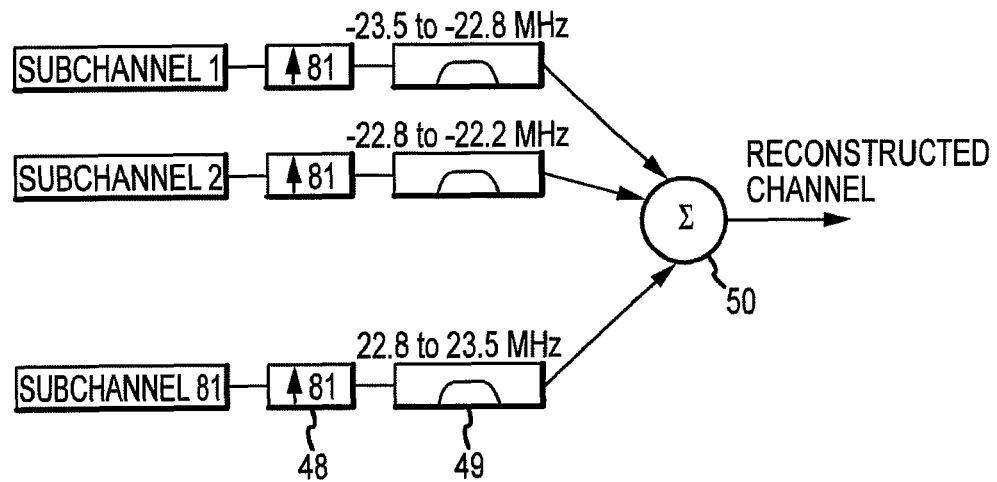
FIG. 16 is a block diagram of a sub-channel reconstruction process, according to an exemplary embodiment of the present invention.

To complete the reconstruction process, the decimation and sub-channelization processes must be undone. A combination of upsampling, filtering, and summation are used in reconstruction in a process that is very similar to sub-channelization. First, the data stream is upsampled, the Level 2 outputs having been decimated by 81. The upsampling process inserts 80 pairs of zeros between each I/Q pair, reproducing the MADCAT's 62.5 MSps input data rate. The upsampling creates many images of the sub-channel, and these images are filtered-out by a series of bandpass filters. The filtered sub-channels are summed to form the reconstructed waveform. FIG. 16 is a block diagram of the sub-channel reconstruction process. Since a uniform filter bank is used in the reconstruction process, a polyphase implementation can be used, which allows software routines to implement the task. The bandpass filters 49 perform two functions, removing the images from the upsampling process 48 and providing the proper roll-off function for making the sub-channel complementary with adjacent sub-channels.

Figure 17:
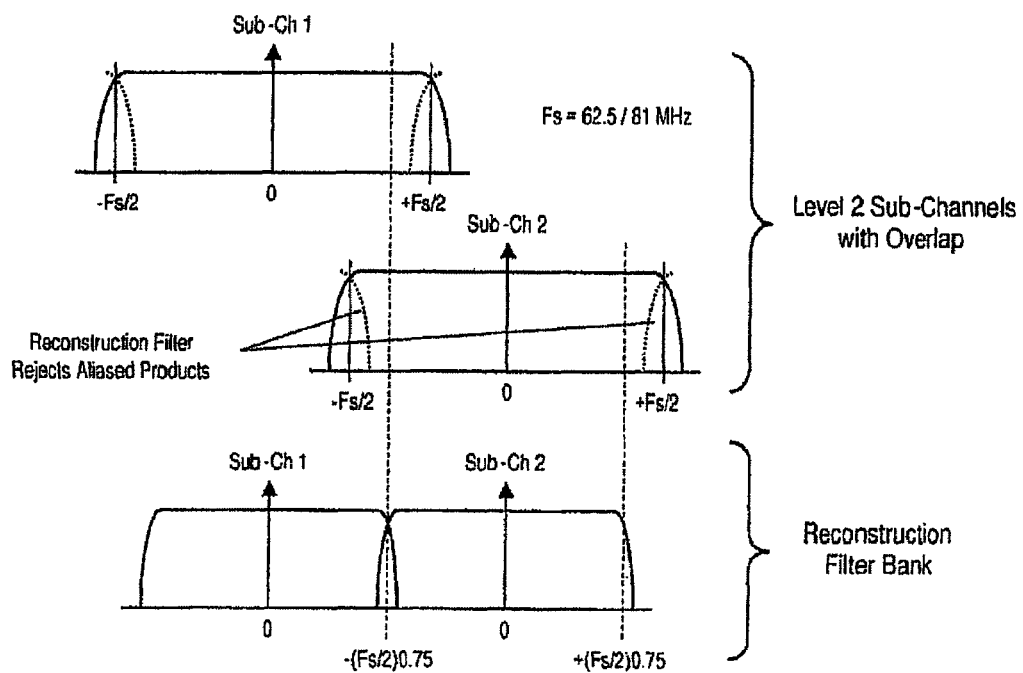
FIG. 17 shows an exemplary reconstruction filter shape used in a reconstruction process according to an embodiment of the present invention.
Figure 18:
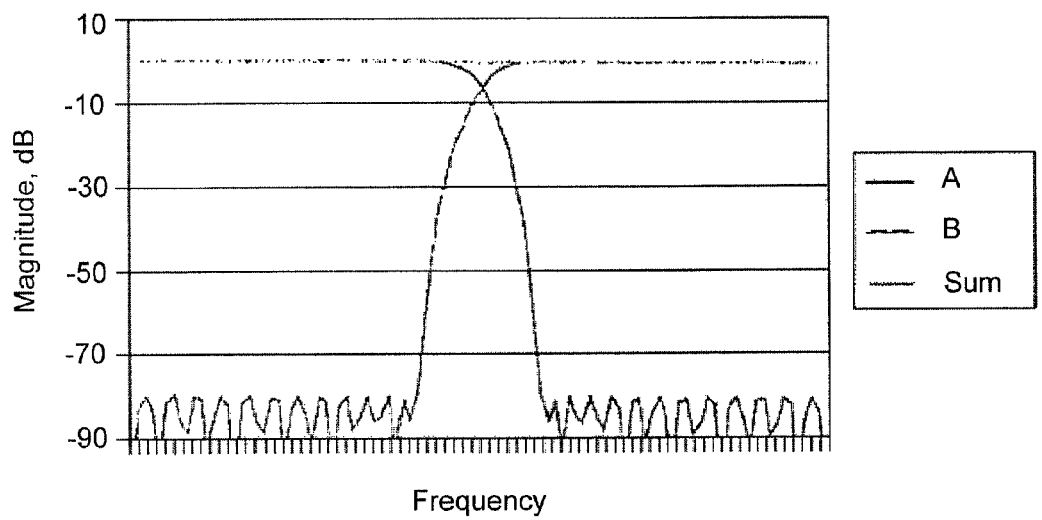
FIG. 18 shows a reconstruction filter crossover region, according to an exemplary embodiment of the present invention.

FIG. 17 shows a filter shape used in the reconstruction process. The roll-off of the filter shape is such that crossover with the adjacent sub-channel occurs at the 6 dB point. The stopband rejection of the reconstruction filter is greater than 70 dB, which is 10 dB more than the sub-channelizer. Passband ripple is less than 0.01 dB. FIG. 18 shows the crossover region for the reconstruction filters. The "A" waveform represents the reconstruction filter from a sub-channel and the "B" waveform represents the adjacent sub-channel. The sum line illustrates how well the two channels add together as a result of the summation process. The preferred sub-channel reconstruction filter is a 2809-tap symmetric FIR filter. A 108-leg polyphase implementation is preceded by a 108-order IDFT. The filter may be implemented using cascaded polyphase filters, similar to the MADCAT sub-channelizer. A more efficient alternative to using the IDFT is utilizing a two-dimensional Winograd approach. In either case, the filtering may be easily performed in real time. Sub-channel reconstruction may determine the gain of the MADCAT, which is typically slightly less than 1.0. The delay through the sub-channelizer and the sub-channel reconstruction are not corrected-for. When comparing the MADCAT input to output, a fixed time offset is used.

Channel Reconstruction

Channel reconstruction is a process similar to sub-channel reconstruction, except that different filter bandwidths and different upsampling rates are used, and the output is real-only, not complex. The preferred channel reconstruction filter is a 7680-tap symmetric FIR filter. The order of this filter is large to account for sub-channel alignment between adjacent channels. The sub-channels of a channel do not line up with the next channels, so the channel reconstruction process cannot rely on the filter shape in the sub-channel reconstruction process. The transition band is about 0.4 sub-channels wide, so that a higher clock rate must be used compared with the sub-channel reconstruction. An IDFT of order twenty is used in the channel reconstruction process, and the data are upsampled by twelve to produce 750 MSps data. The preferred channel reconstruction process produces 16-bit signed data. Alternatively, the channel reconstructor may produce 8-bit-offset data. An IDFT is used to reconstruct and upsample by 24, to produce 1500 MSps data, supporting 470 MHz bandwidth.

Delays produced in the MADCAT and in the two reconstruction processes are accounted-for in the channel reconstruction process. If the input data were digital data, the reconstructed data would be precisely aligned in time and phase with the input data.

The MADCAT is implemented on a single VME board, using five Xilinx XCV1000 field-programmable gate arrays (FPGAs) and associated support logic for the FPGAs. Nonvolatile storage of configuration data is provided by a flash memory. A small-scale programmable device manages the flash and coordinates reprogramming of the flash via a personal computer's parallel printer port. Test points are provided for all of the main internal data buses. Each test point is buffered so that any attached test equipment does not affect the MADCAT operation. The main power supply provides power used by the flash, buffers, and FPGA I/O.

The output from the MADCAT board is a stream of compressed packets that are transmitted to remote computers via a command and data interface (CDI). The computers store the data, in real time, to a RAID, so that the packet data can be uncompressed and analyzed in non-real time.

A determination of MADCAT FPGA utilization was made, for each FPGA. The utilization determination was made by dividing the number of logic elements used in each FPGA by the number of elements available. The resultant values are expressed in Table 5 as a percentage of each FPGA that is utilized.

MADCAT FPGA Utilization

TABLE 6

| FPGA | Function | Utilization |
| --- | --- | --- |
| U1 | Sub-channelizer | 81% |
| U2 | BNE, Detect, Integrate & Threshold | 62% |
| U3 | Connected Regions | 1.3% |
| U4 | Packet Format | 31% |
| U5 | Command & Data interface | 2.1% |

These values are not the same as the gate counts used in estimating ASIC power consumption. As shown in Table 5, the MADCAT design will fit into two FPGAs. The preferred MADCAT divides the operation into five FPGAs in order to allow for observation of data between processing steps and to provide for a modular development process.

Figure 19:
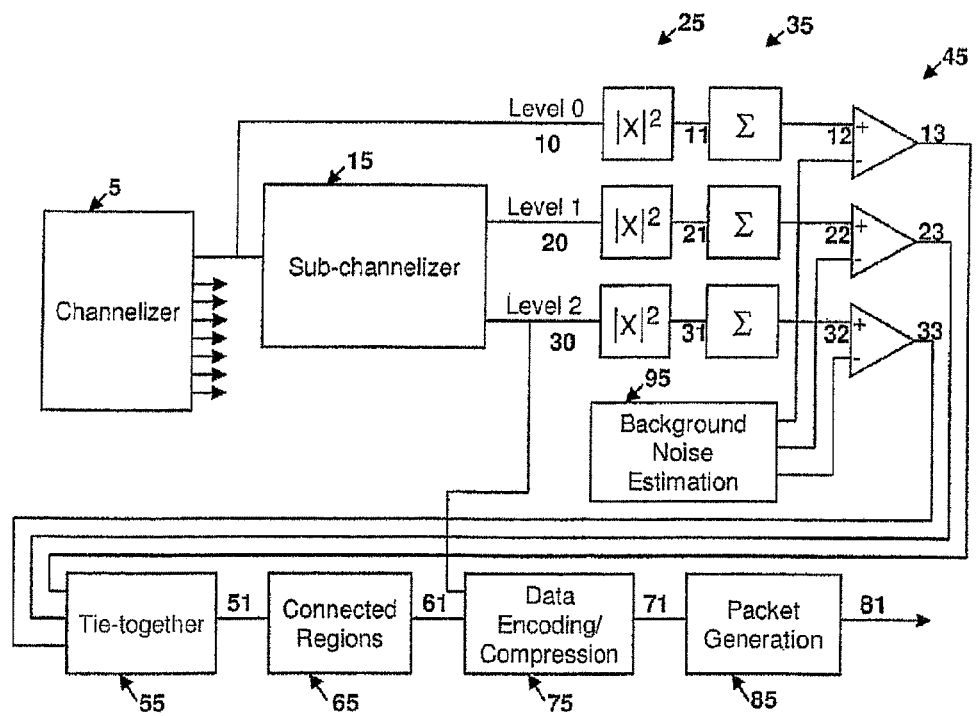
FIG. 19 is a block diagram of a matched detector channelizer with adaptive threshold, according to an exemplary embodiment of the present invention.

FIG. 19 is a block diagram of an exemplary MADCAT system. The MADCAT input is a digitized waveform 10 that, in general, is obtained from a channelizer 5. The input to the MADCAT is referred-to herein as a channel. The sub-channelizer 15 divides the channel into a sequence of smaller bandwidth sub-channels. FIG. 19 shows two levels of sub-channelization 20, 30. Any number of levels of sub-channelization may be performed by adding levels to the sub-channelizer 15 and adding additional corresponding detection blocks 25. The sub-channelizer 15 produces data streams having smaller bandwidths and lower data rates than the input channel. Each of the sub-channels is subjected to a detection process using individual detection blocks 25. The detection process of the detection blocks 25 determines signal magnitude squared. The input channel 10, also referred-to as Level 0, is also detected by a detection block 25. The magnitude squared values 11, 21, 31 are then processed by the integrators 35, forming the sum of the current magnitude squared together with a number of previous magnitude squared values. The results 12, 22, 32 of the integration process are then compared with a threshold value by comparators 45, in order to determine detects 13, 23, 33. The threshold values used for determining detects are either programmed manually, or are automatically determined by the background noise estimator (BNE) 95. The BNE 95 determines the average noise level present in each sub-channel. The thresholds are set to provide an acceptable false alarm rate, which is the rate that a detector indicates pulse activity when stimulated with noise only. The signals generated by the threshold comparators 45 are processed by the tie-together logic 55. The tie-together combines the detection information from all Levels 13, 23, 33 into a single time/frequency image 51. Since each level contains the same information as the other levels, but with different time and frequency resolutions, a single pulse may cause detects in more than one level. The tie-together logic 55 recognizes such an occurrence, and forms an estimate of the true time and frequency locations of the pulse energy. The composite detection image from the tie-together logic 55 is processed by the connected regions 65. The connected regions 65 determine a rectangular bound, which completely encloses each composite detect. After the composite detect has been determined, the Level 2 data 30 is selected for inclusion in the output packets 71. The data selection operation includes using information corresponding to the composite detects and, optionally, information of an area surrounding the composite detects. Once the data have been selected, the data are encoded and compressed in the encoder/compressor 75. The compressed data is formed into packets, which constitute the output of the MADCAT, by the packet generator 85.

FIGS. 20A-20C illustrate an operation of a bandwidth detecting scheme for the MADCAT. A summer 16 is shown to represent that the input to the channelizer 5 includes both a signal component and a noise component. An actual summer circuit is not used, but an ersatz summer is effected by the presence of the noise. The absolute squarer 18 multiplies the signal against itself, thereby producing an absolute, or magnitude signal, converting the signal to a positive real signal that has improved signal-to-noise characteristics for the desired pulse energy. In FIG. 20A, a pulse with a short pulse width, which is too short for the particular sub-channel, has a significant portion of its energy outside the sub-channel band, which degrades performance. Therefore, the threshold of the subsequent comparison is set so that the short width pulse does not result in a detect for the particular sub-channel. The frequency extent of the detected signal as a function of time must then be determined by a like process for a sub-channel with a wider bandwidth. In FIG. 20B, a pulse has a pulse width that 'matches' the bandwidth of the particular sub-channel, so that a resulting absolute squaring of the signal by the absolute squarer 18 creates a signal that crosses a threshold in a subsequent comparing. The frequency extent of the detected signal as a function of time is thereby determined to be in a detect range for the particular sub-channel. In FIG. 20C, a pulse with a long pulse width, which is too long for the particular sub-channel, has essentially all of its energy in-band, but this also lets-in too much noise. Therefore, the threshold of the subsequent comparison is set so that the long width pulse does not result in a detect for the particular sub-channel. The frequency extent of the detected signal as a function of time must then be determined by a like process for a sub-channel with a narrower bandwidth. The particular frequencies in a pulse are not significant since the determination is only based on the pulse width.

FIG. 21 is an comparison plot of detection performance over a range of pulse widths and signal power to noise density ratios, comparing the performance of a conventional analog crystal video receiver and the performance of an exemplary MADCAT. The conventional receiver has much less detection sensitivity than a near-matched bandwidth detector such as a MADCAT detector, which effects a performance gain that is approximately a ten dB decrease in signal-to-noise (S/N) density for every factor of ten increase in pulse width, compared with the conventional receiver.

Figure 22:
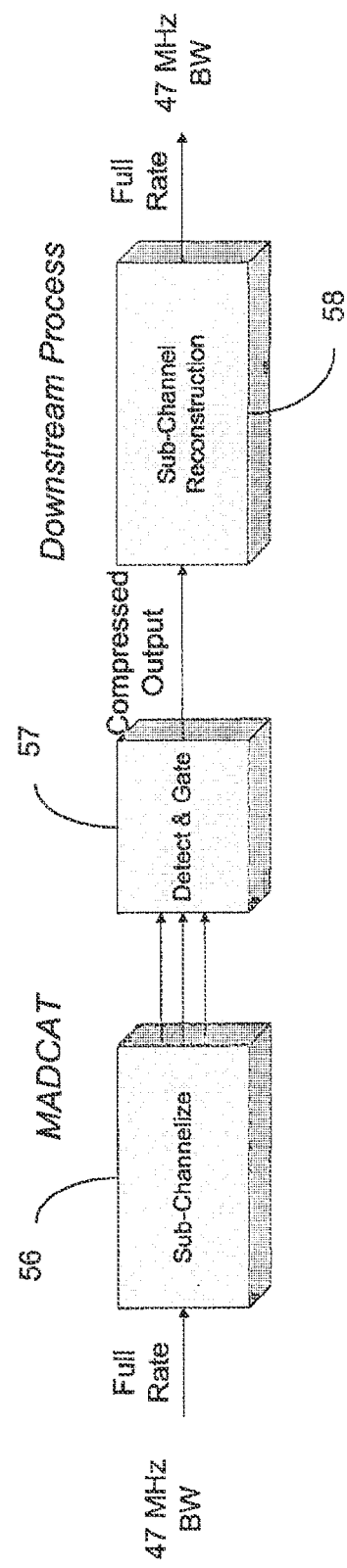
FIG. 22 illustrates an exemplary embodiment of a data compression and decompression system according to the present invention.

FIG. 22 shows an example of how the MADCAT data compression and decompression system may be implemented for a single channel. In this example, a 47 MHz bandwidth is the full rate for the input signal to sub-channelizer 56. Sub-channelizer 56 can provides several levels, having sub-channels with different bandwidths that include bandwidths smaller than the full rate. The detection of threshold crossings by the detection and gating part 57 results in detects being present on individual sub-channels. The use of compression algorithms further reduces the output data rate, and achieves a high compression rate for the compressed output. The sub-channel reconstruction 58 can provide a data stream at the full rate.

Figure 23:
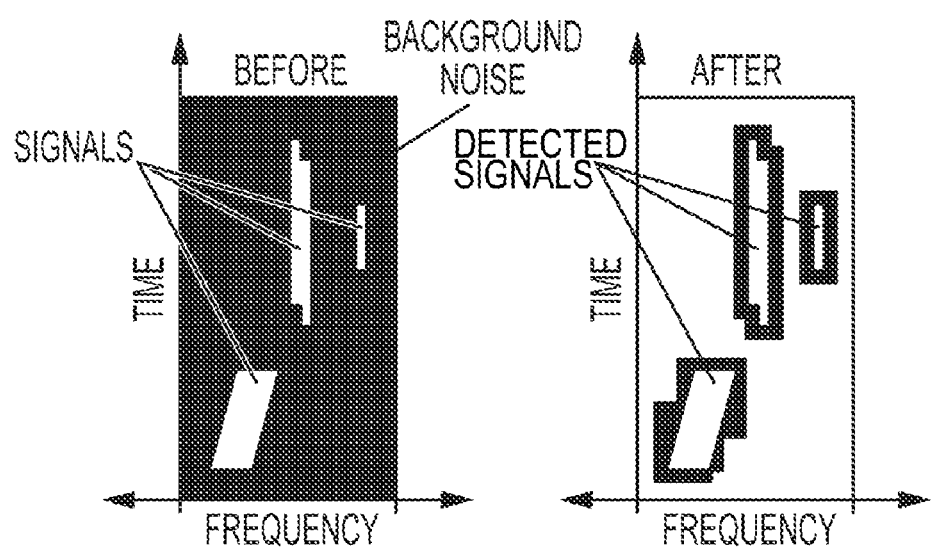
FIG. 23 illustrates an exemplary elimination of background noise by a signal detecting method, according to an embodiment of the present invention.

FIG. 23 shows an exemplary elimination of background noise by a MADCAT signal detecting operation. The data volume of the input contains both the signals and background noise. When the MADCAT data selection operation includes using information of an area surrounding the composite detects, the detected signals and corresponding noise within the area around each detected signal utilize a much smaller data volume, while maintaining data fidelity. This also allows further processing and/or measurements to be performed on the pulsed energy, without degradation due to a compressing operation.

Figure 24:
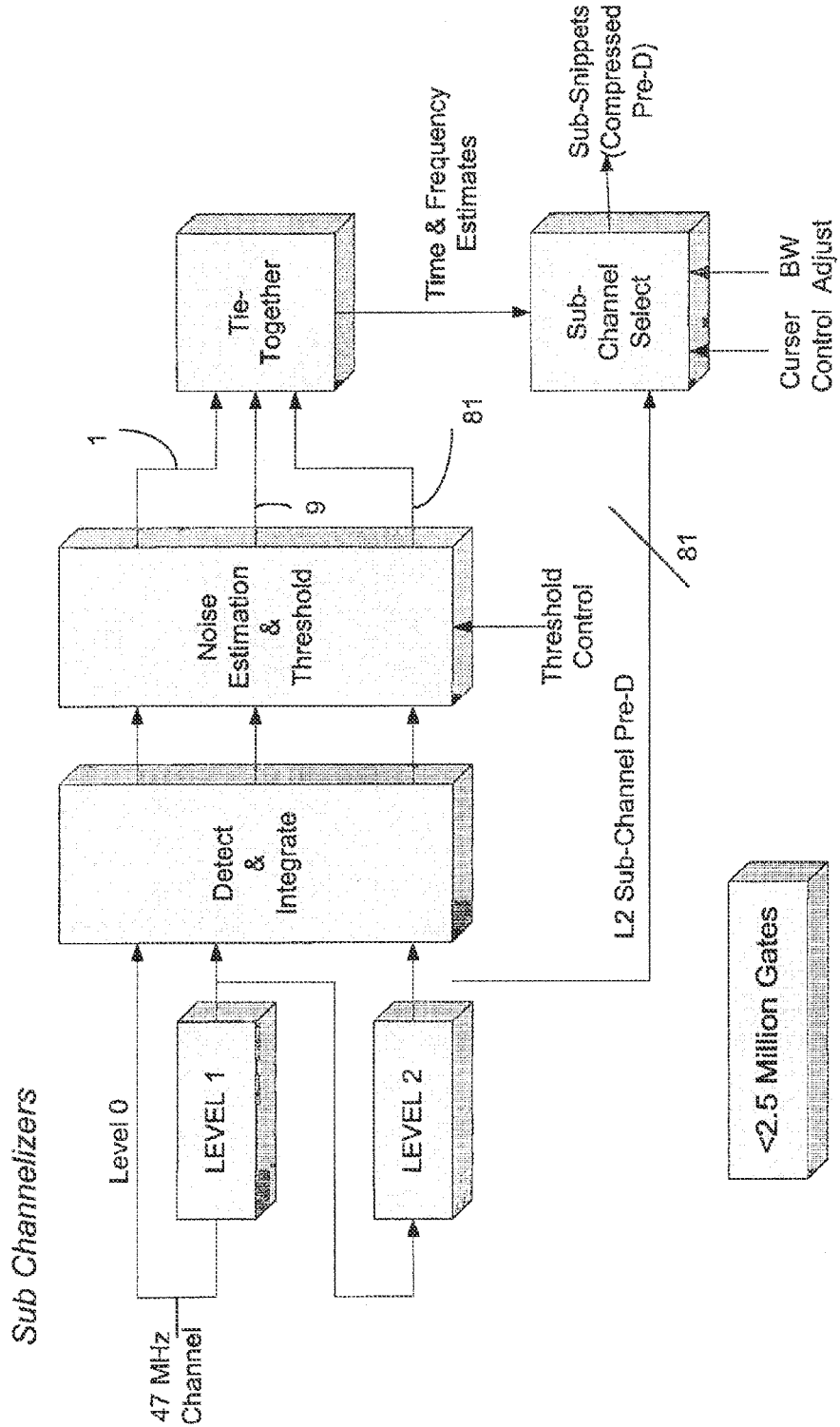
FIG. 24 shows an architecture for implementing sub-channel selection based on time and frequency estimates, according to an exemplary embodiment of the present invention.

FIG. 24 shows signal usage for an exemplary MADCAT. A threshold control is used for selectively changing the sensitivity for determining detects. For example, the thresholding may be changed or adapted for a change in ambient noise levels, for a change in a S/N ratio for the input channel, for a change in error tolerance, and for other reasons. The time and frequency estimates from the tie-together are used as a basis for selection of pre-detection information from the Level 2 sub-channels. In addition, the actual selection of data for outputting as compressed pre-detection information can be controlled by adjusting the bandwidth of data to be compressed in a particular packet. The bandwidth control is used for frequency padding. Likewise, a cursor control can adjust a starting and ending point for data to be included in compressed pre-detection packets. Once a detect has been identified, an amount of data greater than just for that detect can be included in the output data (e.g., pre-detect and post-detect). The compressed pre-D information is shown as 'sub-snippets.'

Figure 25:
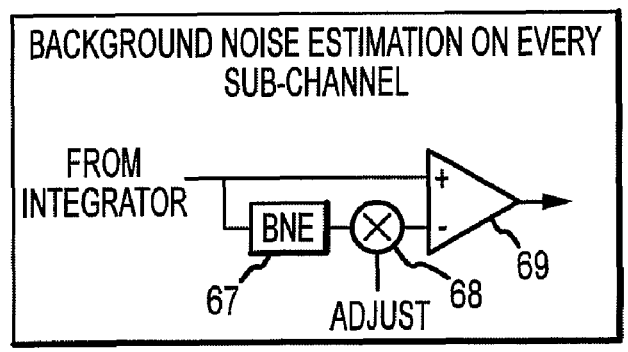
FIG. 25 illustrates a circuit configuration for estimating background noise on every sub-channel, according to an exemplary embodiment of the present invention.

FIG. 25 shows an exemplary circuit for thresholding by estimating background noise on every sub-channel. An integrated sub-channel signal is input to one input of an amplifier 69 and to the background noise estimator (BNE) 67. The noise estimate signal from the BNE 67 can be adjusted in order to adjust the respective resultant threshold signal being output from the amplifier 69, as discussed above. The adjusted background noise estimate signal is input to the other input of the amplifier 69, which outputs a threshold signal.

Figure 26:
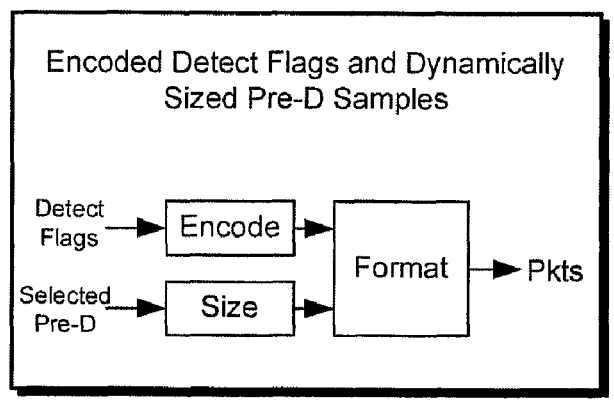
FIG. 26 is a flow diagram for lossless compression using encoded detect flags and dynamically sized pre-detection samples, according to an exemplary embodiment of the present invention.

FIG. 26 is a flow diagram for an exemplary lossless compression of the output data stream into packets. Detect flags from the tie-together that represent information from all three levels are encoded into a single set of detect/no-detect flags. These same tie-together results correspond to the selected pre-D data that is sized for subsequent formatting into one of the several output packet types. The formatting assembles the particular type of packet (see, for example, FIG. 15) using the encoded detect flags and the sized selected pre-D data. The output packet header indicates the locations in time and frequency where the pre-D data belong, and where the data is located later in the packet. In the MADCAT, each packet represents a frame, which is a set of 81 sub-channels from Level 2 of the sub-channelizer, and each I/Q pair in a frame represents a different frequency. Preferably, all the I/Q pairs in the frame occur at the same time.

FIG. 27 is an exemplary falling raster display simulation of a MADCAT performance monitoring, together with time-based displays of compression performance and pre-detection output. The individual detector outputs for Levels 0 to 2 are displayed as a function of time and frequency. It can be seen that the tie-together output, which associates detections and triggers pre-D collection, has a greatly reduced data volume due to the combination of the square-law detecting, thresholding, and frequency extent-based selecting. The sub-band tuning displays show pre-D output as magnitude and phase, in time domain. The magnitude display can be used for adjustment of the threshold level for an individual sub-channel.

FIG. 28 illustrates an exemplary use of parallel MADCATs being used in an application that may be implemented using parallel ASIC devices in a wideband digital receiver. The receiver's input stage may utilize a heterodyne type frequency converter 90 that mixes the received signal with a local oscillator signal to convert the received frequency to an intermediate frequency (IF). A bandwidth of the IF signal can be, for example, 460 MHz. A gain control 91 is used for automatic gain control in a known manner. The output of the gain control 91 is fed to an analog-to-digital converter 92 that outputs a digitized signal to a demultiplexer 93, which separates the digitized signal into individual signals according to a predetermined type of demultiplexing scheme (e.g., TDM). The A/D converter 92 has an sampling clock input that determines the sampling rate being used by the A/D 92. The demultiplexed signals are fed to a channelizer 94 that outputs data in individual channels each having a bandwidth of, for example, 47 MHz. The data on individual channels is processed by a MADCAT 95 so that all the channels are processed in parallel. Each MADCAT output is stored in memory 96, so that a combined compressed output can be formed by a multiplexer 97 at a later time.

Although the preferred embodiment of the invention has been described herein in detail, it will be readily apparent to those skilled in the art that various modifications may be made, including a use of equivalent and similar apparatus and methodology, without departing from the spirit of the invention or from the scope of the appended claims.

What is claimed is:

1. A method of detecting pulsed energy in a data channel in the presence of noise, comprising:
   receiving a pulsed energy using an antenna;
   analyzing the received pulsed energy at a plurality of pre-detection bandwidths to determine a temporal and spectral extent of the pulsed energy of potential interest within particular frequency bands of the data channel;
   determining whether the temporal and spectral extent of the pulsed energy meets predetermined criteria; and
   outputting only sections of the particular frequency bands' spectra occupied by the pulsed energy meeting the predetermined criteria.

2. A method according to claim 1, wherein the step of outputting includes generating at least one packet.

3. A method according to claim 2, wherein information of the packet specifies a time and frequency region where energy was detected.

4. A method according to claim 2, wherein the step of outputting further comprises providing compressed output data relative to the data rate of the data channel, by selecting data in a time and frequency region around detected pulses.

5. A method according to claim 1, further comprising selecting a digital waveform for a region surrounding the pulsed energy.

6. A method according to claim 5, further comprising the step of providing an output including the digital waveform.

7. A method according to claim 6, wherein the step of outputting and the step of providing each involves generating at least one data packet.

8. A method according to claim 1, wherein the data channel provides a stream of data that is obtained by sampling at a rate sufficient to properly characterize pulsed energy in a specific frequency range.

9. A method according to claim 8, wherein the sampling rate is variable.

10. A method according to claim 8, wherein the sampling rate is fixed.

11. The method of claim 1, wherein the analyzing the received pulsed energy at a plurality of pre-detection bandwidths further comprises:
    dividing the pulsed energy into a first plurality of sub-channels using a first sub-channelizer;
    determining whether the temporal and spectral extent of the pulsed energy in each of the first plurality of sub-channels meet the predetermined criteria; and
    dividing the pulsed energy of each sub-channel that meets the predetermined criteria into a second plurality of sub-channels using a second sub-channelizer.

12. The method of claim 1, wherein the analyzing the received pulsed energy at a plurality of pre-detection bandwidths further comprises analyzing the received pulsed energy at a plurality of pre-detection bandwidths using a plurality of matched detector channelizers.

* * * * *

UNITED STATES PATENT AND TRADEMARK OFFICE
CERTIFICATE OF CORRECTION

| | | |
|---|---|---|
| PATENT NO. | : 8,045,654 B1 | Page 1 of 1 |
| APPLICATION NO. | : 12/239426 | |
| DATED | : October 25, 2011 | |
| INVENTOR(S) | : Robert Anderson | |

It is certified that error appears in the above-identified patent and that said Letters Patent is hereby corrected as shown below:

Column 2, Line 61: Replace "A f", with --$\Delta f$--

Signed and Sealed this
Fourteenth Day of February, 2012

David J. Kappos
*Director of the United States Patent and Trademark Office*